US012695549B2

(12) United States Patent　(10) Patent No.:　US 12,695,549 B2
Dimou et al.　(45) Date of Patent:　Jul. 28, 2026

(54) SKIP HARQ FEEDBACK FOR SPS PDSCH

(71) Applicant: QUALCOMM Incorporated, San Diego, CA (US)

(72) Inventors: Konstantinos Dimou, New York, NY (US); Yan Zhou, San Diego, CA (US); Tao Luo, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 653 days.

(21) Appl. No.: 18/013,871

(22) PCT Filed: Aug. 10, 2021

(86) PCT No.: PCT/US2021/045452
§ 371 (c)(1),
(2) Date: Dec. 29, 2022

(87) PCT Pub. No.: WO2022/035908
PCT Pub. Date: Feb. 17, 2022

(65) Prior Publication Data
US 2023/0179344 A1　Jun. 8, 2023

Related U.S. Application Data

(60) Provisional application No. 63/198,515, filed on Oct. 23, 2020.

(30) Foreign Application Priority Data

Aug. 12, 2020　(GR) ............................ 20200100476

(51) Int. Cl.
| *H04L 1/1829* | (2023.01) |
| *H04B 7/06* | (2006.01) |
| *H04L 1/1867* | (2023.01) |
| *H04L 5/00* | (2006.01) |

(52) U.S. Cl.
CPC ....... *H04L 1/1854* (2013.01); *H04B 7/06952* (2023.05); *H04L 1/1896* (2013.01); *H04L 5/0055* (2013.01)

(58) Field of Classification Search
CPC ... H04L 1/1854; H04L 1/1896; H04L 5/0055; H04L 1/1887; H04L 1/1685; H04B 7/0695; H04B 7/088

(Continued)

(56) References Cited

U.S. PATENT DOCUMENTS

2019/0222394 A1　7/2019　Medles et al.
2020/0044782 A1　2/2020　Vaidya et al.
(Continued)

FOREIGN PATENT DOCUMENTS

EP　　　3826205 A1　5/2021
WO　　2020029886 A1　2/2020

OTHER PUBLICATIONS

International Search Report and Written Opinion—PCT/US2021/045452—ISA/EPO—Nov. 29, 2021.

(Continued)

*Primary Examiner* — Mang Hang Yeung
(74) *Attorney, Agent, or Firm* — Procopio, Cory, Hargreaves & Savitch

(57) ABSTRACT

Methods, computer programs products, and apparatuses for SPS reactivation are provided. An example method at a UE includes determining that a base station skips one or more semi-persistent scheduling (SPS) physical downlink shared channel (SPS PDSCH) occurrences. The method further includes skipping transmission of a hybrid automatic repeat request (HARQ) feedback for the one or more SPS PDSCH occurrences.

27 Claims, 18 Drawing Sheets

1000 ──▶

(58) Field of Classification Search
USPC ......................................................... 370/329
See application file for complete search history.

(56)                       References Cited

U.S. PATENT DOCUMENTS

| | | | | |
|---|---|---|---|---|
| 2020/0396684 | A1* | 12/2020 | Lin | ................... H04W 52/0238 |
| 2021/0243763 | A1* | 8/2021 | Zhou | .................... H04L 1/1819 |
| 2022/0095337 | A1* | 3/2022 | Wang | ................... H04L 5/0053 |
| 2023/0171037 | A1* | 6/2023 | Chen | .................... H04L 5/0055 |
| | | | | 714/726 |

OTHER PUBLICATIONS

Qualcomm Incorporated: "HARQ-ACK Enhancement for IOT and URLLC", 3GPP Draft, 3GPP TSG RAN WG1 #102-e, R1-2006799, 3rd Generation Partnership Project (3GPP), Mobile Competence Centre, 650, Route Des Lucioles, F-06921, Sophia-Antipolis Cedex, France, vol. RAN WG1, No. e-Meeting, Aug. 17-Aug. 28, 2020, Aug. 8, 2020 (Aug. 8, 2020), XP051918249, pp. 1-15, pp. 1-3, section 1, section 2 .1. 2.
Vivo: "HARQ-ACK Enhancements for Rel-17 URLLC" 3GPP Draft, 3GPP TSG RAN WG1#102-e, R1-2005374, 3rd Generation Partnership Project (3GPP), Mobile Competence Centre, 650, Route Des Lucioles, F-06921, Sophia-Antipolis Cedex, France, vol. RAN WG1, No. e-Meeting; Aug. 17-Aug. 28, 2020, Aug. 8, 2020 (Aug. 8, 2020), XP051917399, 2 pages, figures 1, 2 Section 2, section 2. 1. 1.

* cited by examiner

1100

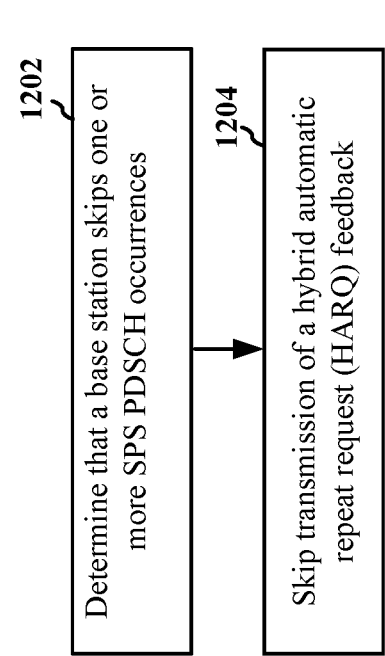
FIG. 12

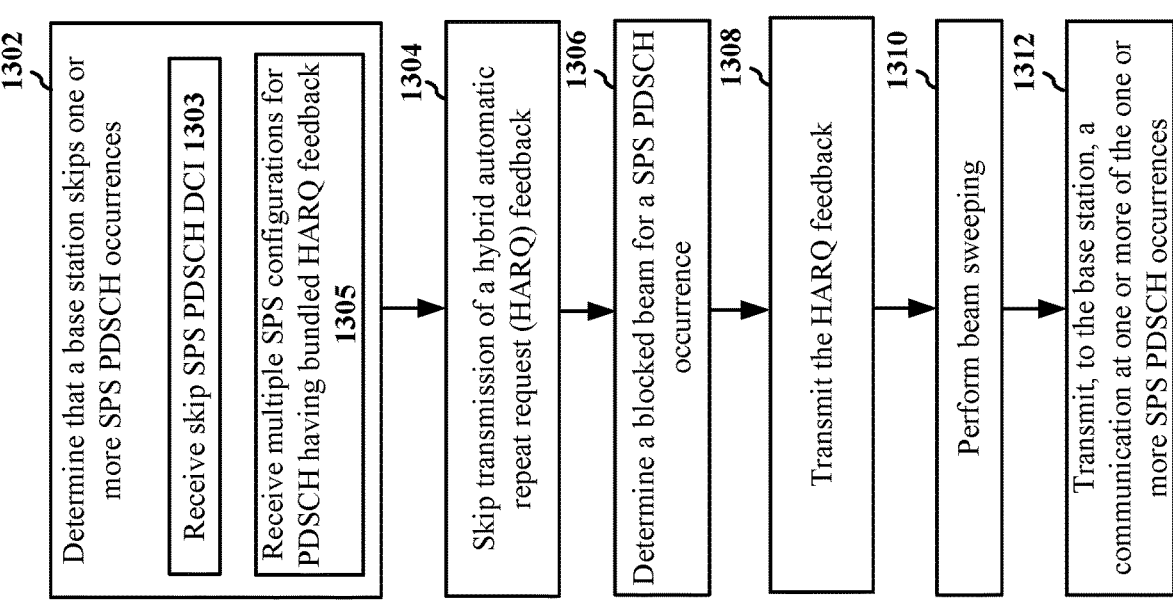

1302 Determine that a base station skips one or more SPS PDSCH occurrences

1303 Receive skip SPS PDSCH DCI

1305 Receive multiple SPS configurations for PDSCH having bundled HARQ feedback

1304 Skip transmission of a hybrid automatic repeat request (HARQ) feedback

1306 Determine a blocked beam for a SPS PDSCH occurrence

1308 Transmit the HARQ feedback

1310 Perform beam sweeping

1312 Transmit, to the base station, a communication at one or more of the one or more SPS PDSCH occurrences

Configure a UE for a SPS PDSCH

1504

Transmit an indication to the UE that the base station will skip a transmission of one or more SPS PDSCH occurrences

1506

Skip transmission of the one or more SPS PDSCH occurrences

1508

Receive, from the UE, a communication at one or more of the one or more SPS PDSCH occurrences

SKIP HARQ FEEDBACK FOR SPS PDSCH

CROSS REFERENCE TO RELATED APPLICATION(S)

This application is a National Stage Application filed under 35 U.S.C. § 371 of PCT International Application Serial No. PCT/US2021/045452 entitled "SKIP HARQ FEEDBACK FOR SPS PDSCH" and filed on Aug. 10, 2021, which claims the benefit of and priority to U.S. Provisional Application Ser. No. 63/198,515, entitled "TRANSMIT-TING AN INDICATION OF A SEMI-PERSISTENT SCHEDULING DOWNLINK SHARE CHANNEL OCCURRENCE", and filed on Oct. 23, 2020, and Greek Patent Application Serial No. 20200100476, entitled "SKIP HARQ FEEDBACK FOR SPS PDSCH" and filed on Aug. 12, 2020, each of which is expressly incorporated by reference herein in its entirety.

TECHNICAL FIELD

The present disclosure relates generally to communication systems, and more particularly, to a wireless communication system with semi-persistent scheduling (SPS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Methods, computer programs products, and apparatuses for SPS reactivation are provided. In one aspect of the disclosure, a method, a computer-readable medium, and an apparatus are provided for wireless communication at a user equipment (UE). The UE may determine that a base station skips one or more semi-persistent scheduling (SPS) physical downlink shared channel (SPS PDSCH) occurrences. The UE may skip transmission of a hybrid automatic repeat request (HARQ) feedback for the one or more SPS PDSCH occurrences.

In another aspect of the disclosure, a method, a computer-readable medium, and an apparatus are provided for wireless communication at a base station. The base station may configure a UE for an SPS PDSCH. The base station may transmit an indication to the UE that the base station will skip a transmission of one or more SPS PDSCH occurrences. The base station may skip the transmission of the one or more SPS PDSCH occurrences.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 12 is a flowchart of a method of wireless communication at a UE.

FIG. 13 is a flowchart of a method of wireless communication at a UE.

DETAILED DESCRIPTION

Figure 1:
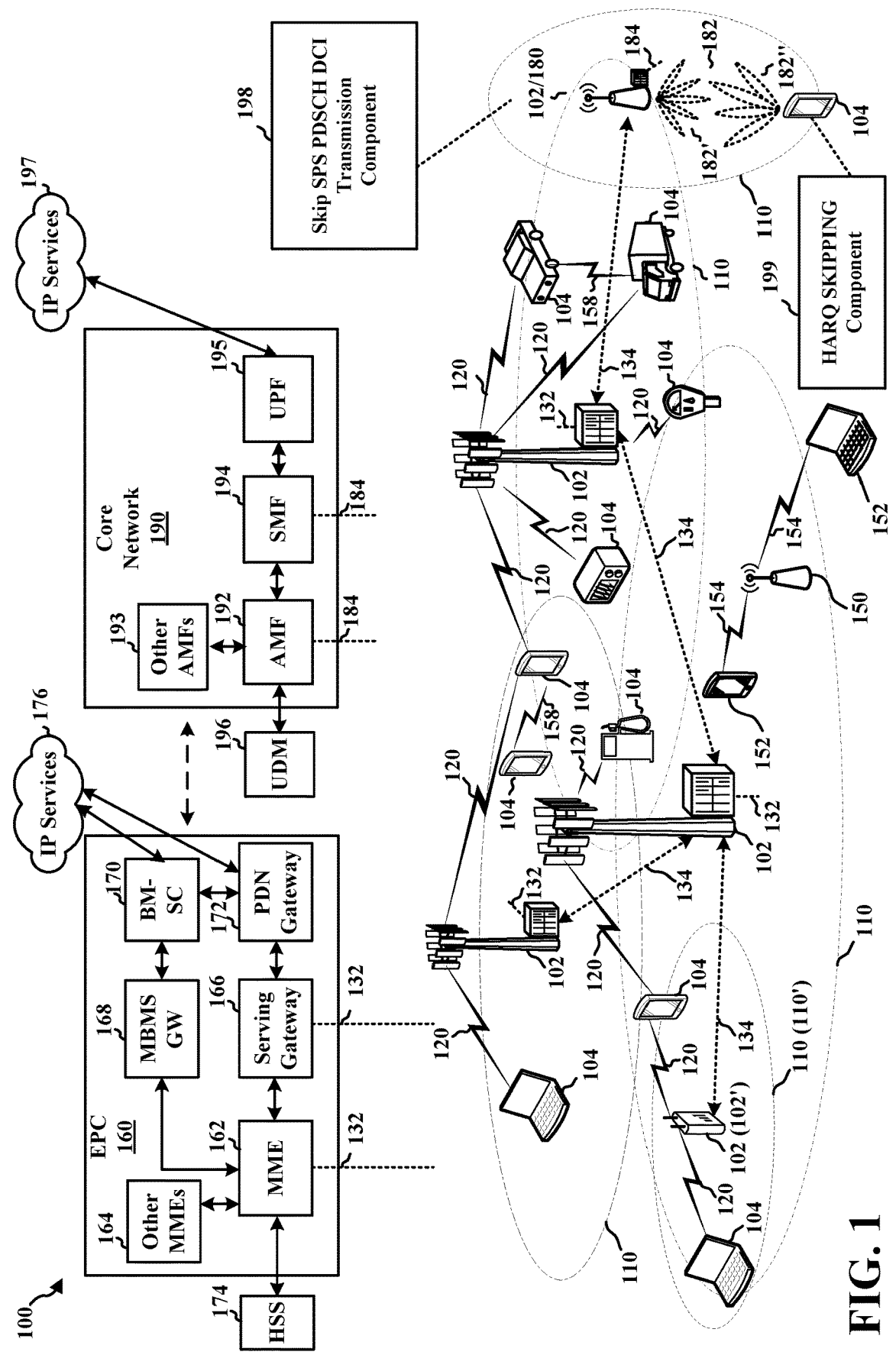
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FP-GAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EE-PROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN)

sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronic s Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the base station 102/180 includes a skip SPS physical downlink shared channel (PDSCH) DCI transmission component 198 configured to transmit a skip SPS PDSCH DCI to a UE 104 and skip transmission of the one or more SPS PDSCH occurrences indicated in the skip SPS PDSCH DCI. In certain aspects, the UE 104 includes a HARQ skipping component 199 configured to determine that the base station 102/180 skips one or more SPS PDSCH occurrences and to skip transmission of a HARQ feedback for the one or more SPS PDSCH occurrences.

Although the following description may be focused on 5G NR, the concepts described herein may be applicable to other similar areas, such as LTE, LTE-A, CDMA, GSM, and other wireless technologies.

Figures 2A, 2B, 2C, 2D:
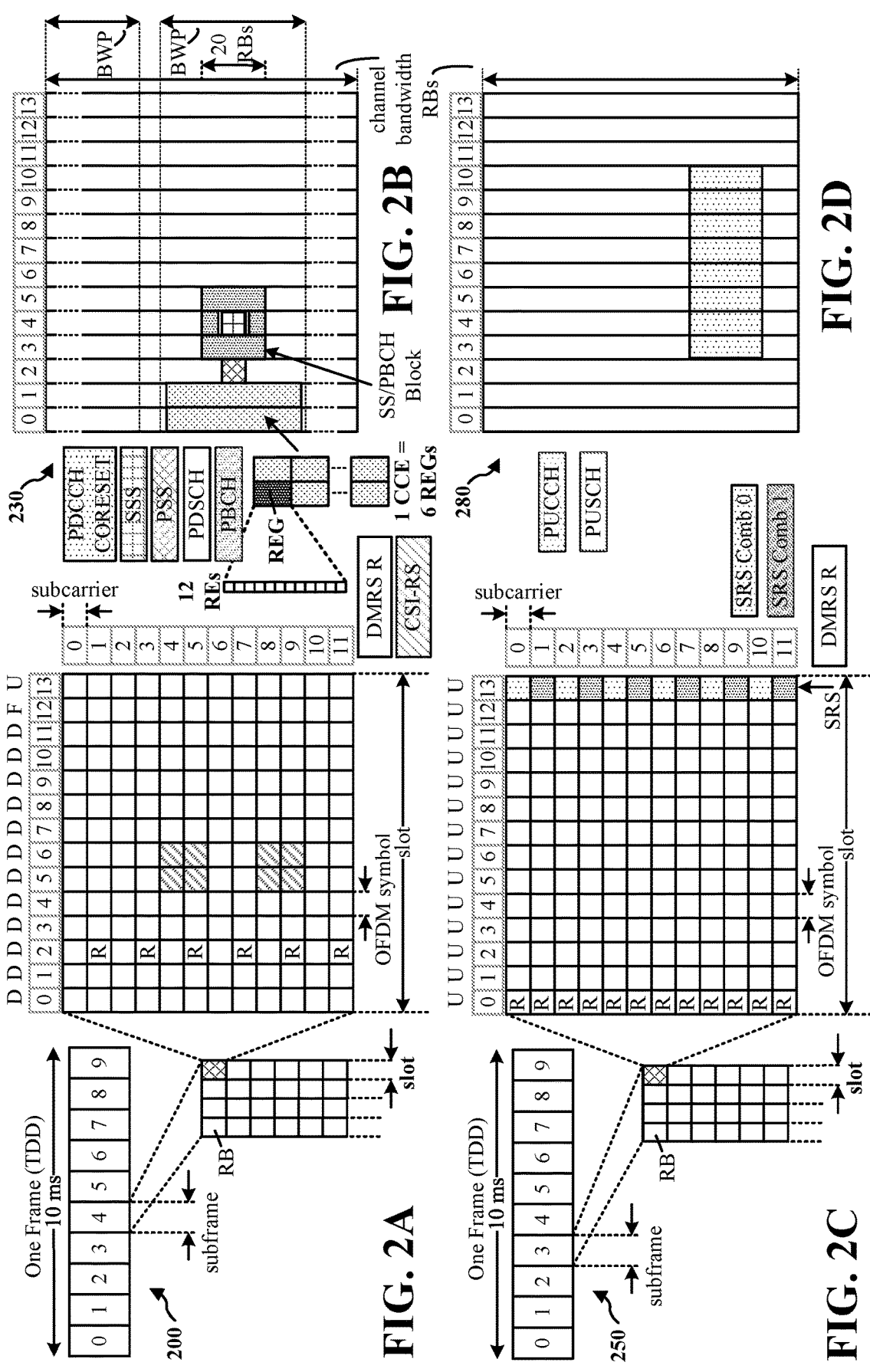
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| | SCS | |
|---|---|---|
| μ | $\Delta f = 2^{\mu} \cdot 15$ [kHz] | Cyclic prefix |
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^{\mu}$ slots/subframe. The subcarrier spacing may be equal to $2^{\mu}*15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
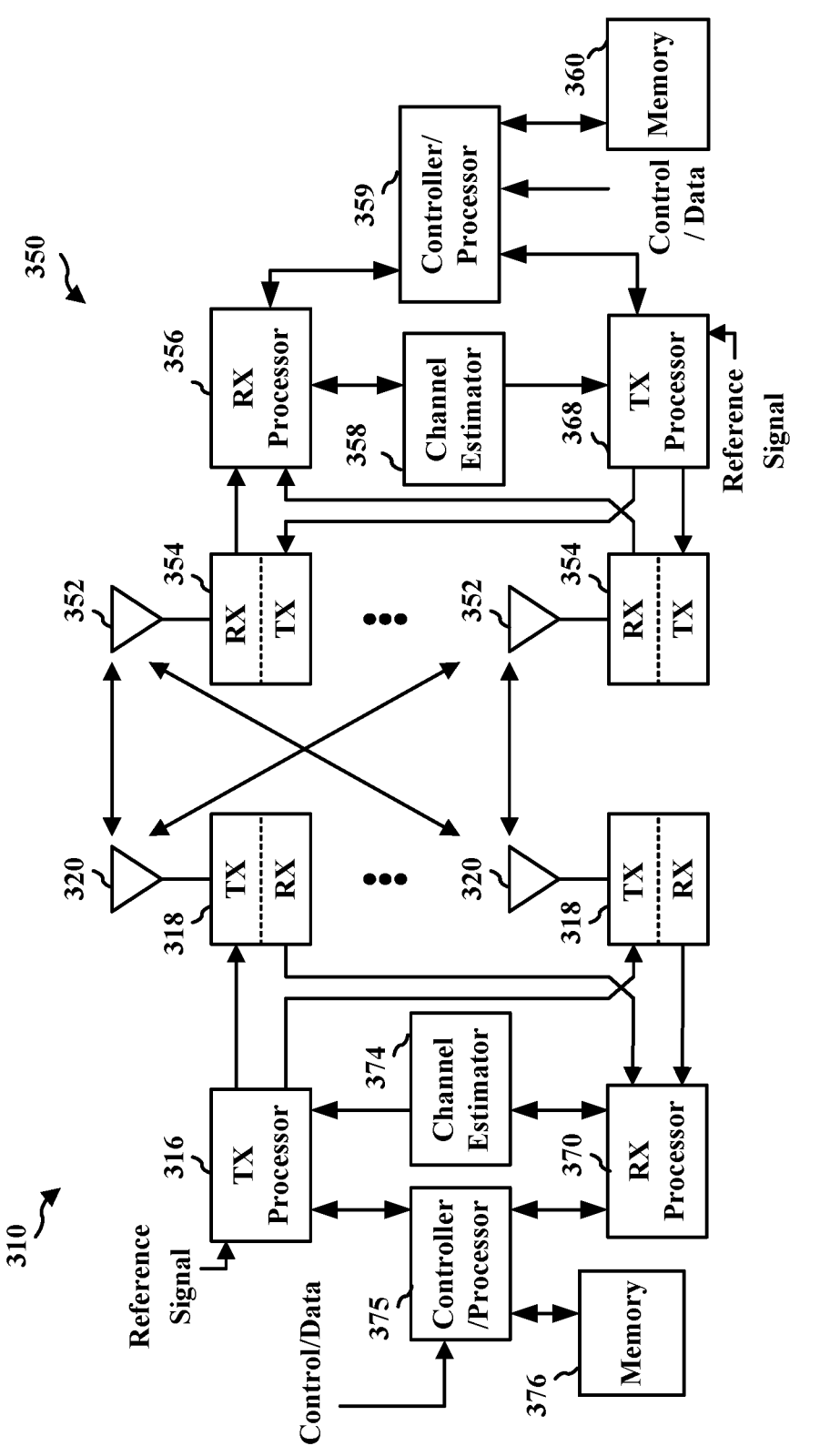
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/ processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with HARQ skipping component 199 of FIG. 1.

At least one of the TX processor 316, the RX processor 370, and the controller/processor 375 may be configured to perform aspects in connection with skip SPS PDSCH DCI transmission component 198 of FIG. 1.

Figure 4A:
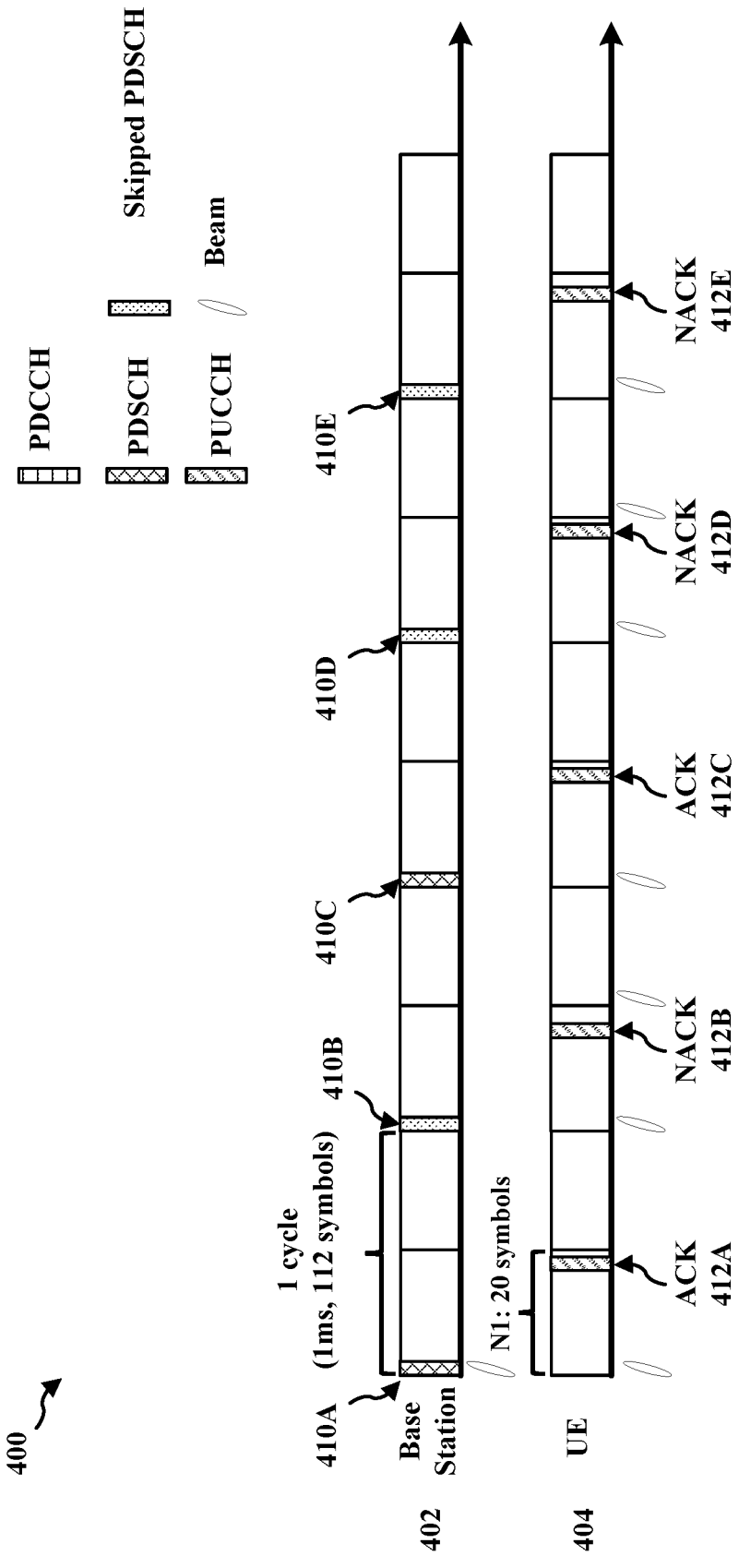
FIG. 4A illustrates an example communication between a base station and a UE.

In wireless communication systems, a base station may configure, or schedule, a UE with SPS resources for SPS PDSCH transmissions between a UE and a base station. After receiving the configuration for the SPS resources, the UE may monitor for PDSCH from the base station in the periodic resources, e.g., without individual DCI scheduling the PDSCH. FIG. 4A illustrates an example communication 400 between a base station 402 an a UE 404. The base station 402 may transmit a SPS PDSCH 410A (a SPS PDSCH may also be referred to as a SPS PDSCH occurrence) to the UE 404 using semi-static or periodic resources. The UE 404 may transmit HARQ feedback 412A indicating acknowledgment of reception (ACK) to the base station 402 after receiving the SPS PDSCH 410A. The base station 402 may skip a subsequent SPS PDSCH 410B for a variety of reasons. For example, the base station 402 may skip the SPS PDSCH 410B to free up resources for another, higher priority transmission.

The UE 404 may not be aware that the base station 402 skipped a PDSCH transmission in the SPS PDSCH occasion 410B. Therefore, the UE 404 may still transmit a HARQ feedback 412B indicating non-acknowledgment (NACK) for the skipped SPS PDSCH occasion 410B, as though the UE was unsuccessful in receiving a transmitted PDSCH. FIG. 4A also shows that the base station 402 may transmit another SPS PDSCH 410C to the UE 404, and the UE 404 may transmit an ACK 412C back to the base station 402 upon reception of the SPS PDSCH 410C. The base station 402 may also determine to skip SPS PDSCH occasions 410D and 410E and the UE 404 may nonetheless transmit NACK 412D and 412E to the base station 402. The NACK transmissions are unnecessary for the base station 402, because the base station 402 is aware that the UE 404 did not receive the SPS PDSCH due to the SPS PDSCH transmissions being skipped by the base station 402. These unnecessary NACK transmissions waste power at the UE and use additional radio resources.

Figure 4B:
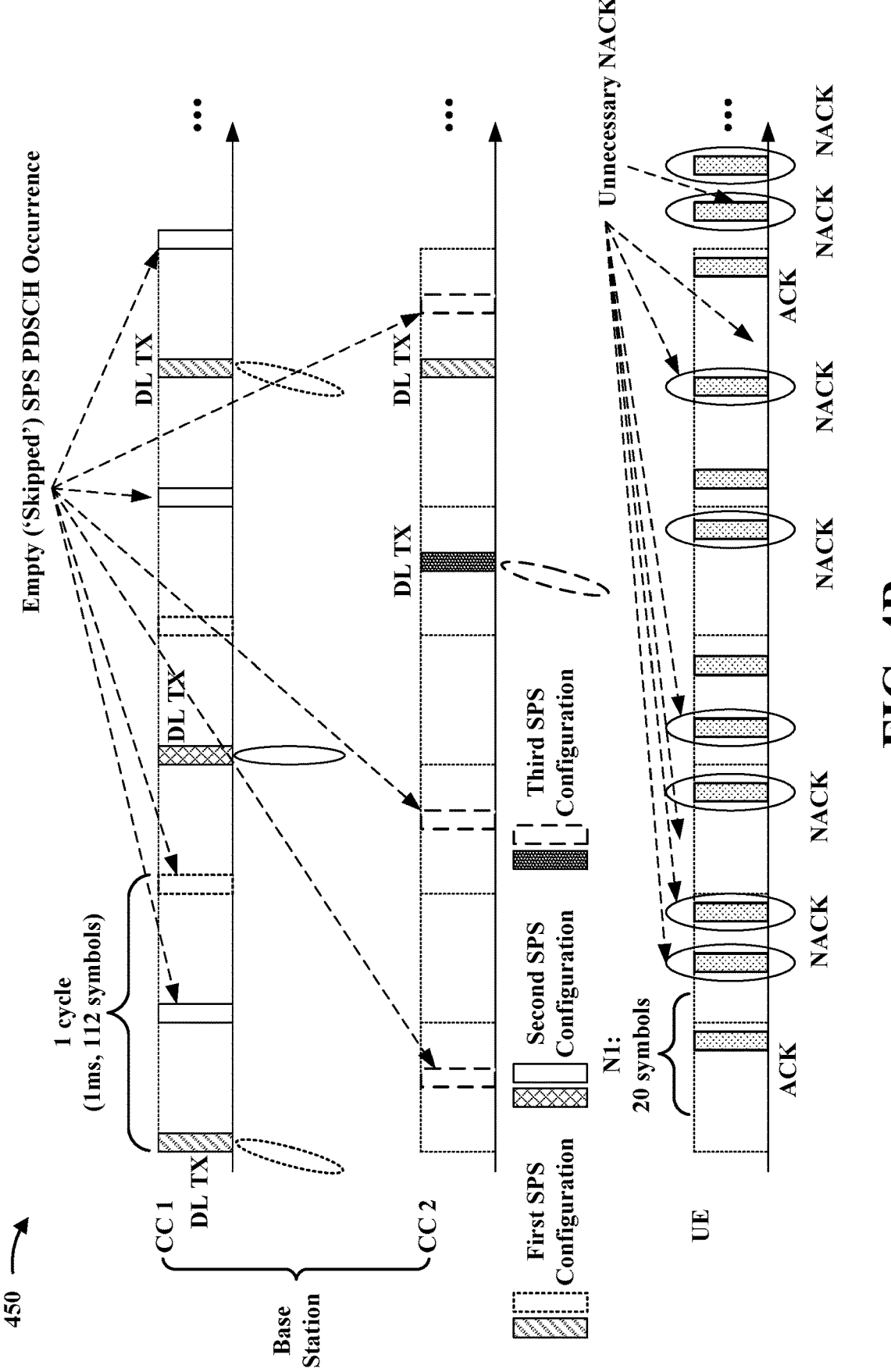
FIG. 4B illustrates an example communication between a base station and a UE.

FIG. 4B is a diagram illustrating another example 450 of a skipped SPS PDSCH occurrence. As shown in FIG. 4B, a base station (e.g., base station 180) may configure SPS PDSCH resources with a plurality of SPS PDSCH occurrences. The SPS PDSCH may be configured to improve reliability and reduce latency. The plurality of SPS PDSCH occurrences may be associated with one or more component carriers and/or SPS configurations. In the example shown in FIG. 4B, a first set of SPS PDSCH occurrences may be associated with a first SPS configuration in a first component carrier (CC1), a second set of SPS PDSCH occurrences may be associated with a second SPS configuration in the first component carrier, and a third second set of SPS PDSCH occurrences may be associated with a third SPS configuration in a second component carrier (CC2). In the illustrated example, the first component carrier may be associated with two SPS configurations, and the second component carrier may be associated with one SPS configuration.

In some cases, the base station may perform a downlink transmission on one or more SPS PDSCH occurrences from the plurality of SPS PDSCH occurrences. For example, the base station may schedule downlink transmission(s) to occur in one or more upcoming SPS PDSCH occurrences.

In the example shown in FIG. 4B, the base station may perform downlink transmission(s) in one or more SPS PDSCH occurrences associated with the first SPS configuration. The base station may perform downlink transmission(s) in one or more SPS PDSCH occurrences associated with the second SPS configuration. The base station may perform downlink transmission(s) in one or more SPS PDSCH occurrences associated with the third SPS configuration.

The base station may not perform downlink transmissions on the remaining SPS PDSCH occurrences of the plurality of SPS PDSCH occurrence. In this case, the remaining SPS PDSCH occurrences may be skipped (or empty) SPS PDSCH occurrences. Skipped SPS PDSCH occurrences may occur for multiple SPS configurations for a single traffic flow (e.g., a single traffic flow between the UE and the base station).

In the example shown in FIG. 4B, the first SPS configuration may be associated with a first set of skipped SPS PDSCH occurrences, the second SPS configuration may be associated with a second set of skipped SPS PDSCH occurrences, and the third SPS configuration may be associated with a third set of skipped SPS PDSCH occurrences.

The UE may be aware of the plurality of SPS PDSCH occurrences, but the UE may be unaware of the skipped SPS PDSCH occurrences. In other words, the UE may not be aware of SPS PDSCH occurrences that are skipped or not used by the base station. When the UE does not receive a downlink transmission at a skipped SPS PDSCH occurrence, the UE may transmit a hybrid automatic repeat request (HARQ) acknowledgement (ACK)/negative acknowledgement (NACK) feedback. In other words, when the UE does not detect a PDSCH at the SPS PDSCH occurrence that is skipped or not used by the base station, the UE may transmit the HARQ ACK/NACK feedback (e.g., a NACK) to the base station.

Since the SPS PDSCH occurrence was skipped and no actual downlink transmission was performed or intended to be performed by the base station, the signaling of the HARQ ACK/NACK feedback from the UE to the base station may be unnecessary. The signaling of the HARQ ACK/NACK feedback may unnecessarily result in additional power consumption at the UE. The signaling of the HARQ ACK/NACK feedback may unnecessarily result in increased uplink interference. The signaling of the HARQ ACK/NACK feedback may unnecessarily result in a corresponding slot being unusable for other downlink or uplink transmissions.

Figure 5:
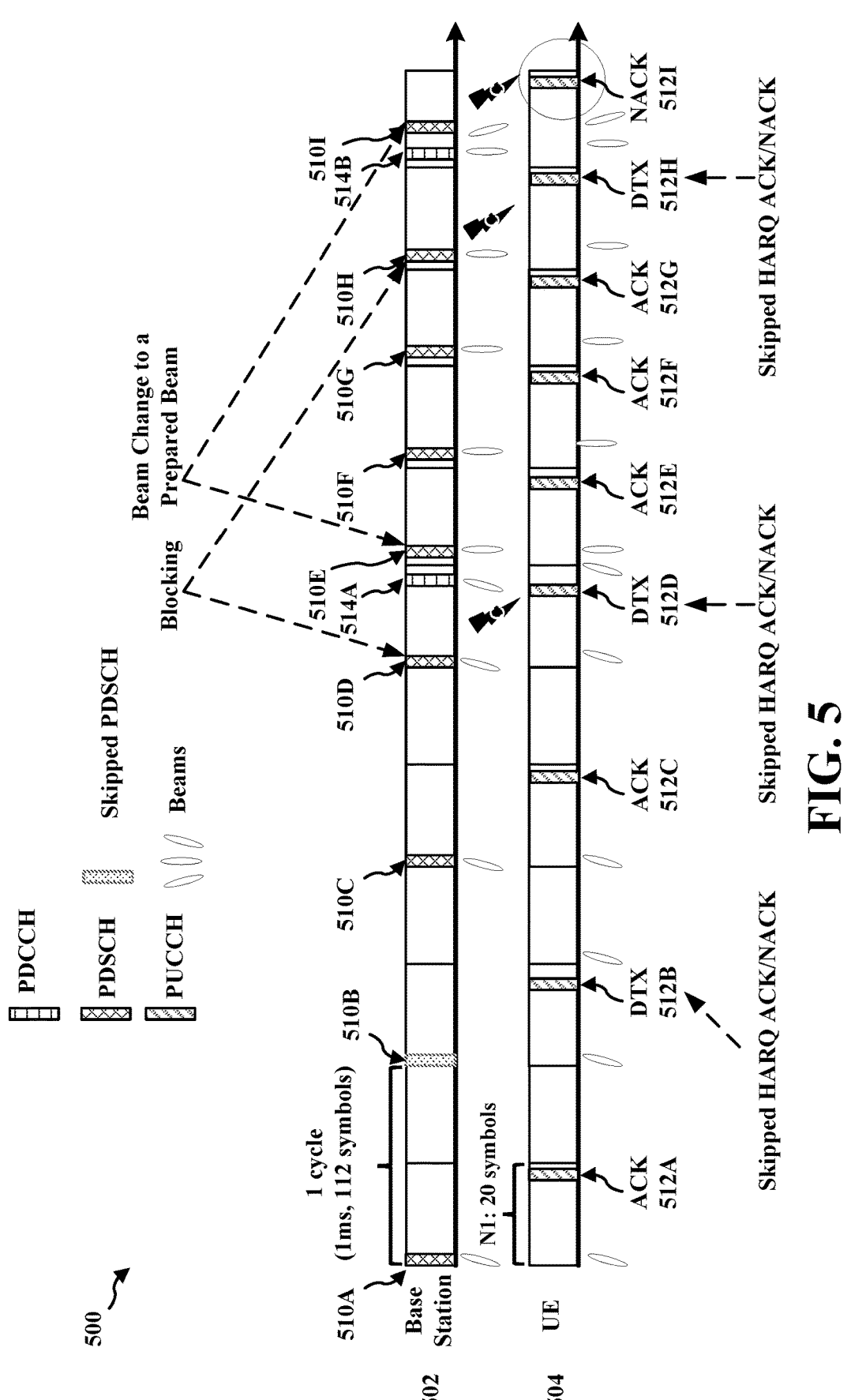
FIG. 5 illustrates an example communication between a base station and a UE.

To mitigate unnecessary NACK transmissions, as illustrated in example 500 of FIG. 5, the UE 504 may skip HARQ feedback. After the base station 502 transmits a SPS PDSCH 510A to the UE 504, the UE 504 may transmit a HARQ feedback indicating ACK 512A to the base station 502. After the base station 502 skips a SPS PDSCH 510B, the UE 504 may transmit a discontinuous transmission (DTX) 512B to the base station 502 and skip the HARQ feedback. The DTX 512B consumes less power and radio resources compared to a HARQ feedback.

The base station 502 may transmit subsequent SPS PDSCH 510C to the UE 504 and the UE 504 may transmit an ACK 512C in response to receiving the SPS PDSCH 510C. A downlink transmission/reception beam used for transmission between the UE 504 and the base station 502 may be blocked due to a variety of reasons such as UE movement, interference, channel condition change, or the like. As the base station 502 attempts to transmit the SPS PDSCH 510D, the UE 504 may be unable to receive the SPS PDSCH 510D due to beam blocking. The UE 504 may transmit a DTX 512D to the base station 502 because the UE 504 did not receive the SPS PDSCH 510D.

Upon reception of DTX 512D, the base station 502 may become aware that there is beam blocking and may transmit a PDCCH 514A to facilitate beam changing between the base station 502 and the UE 504. The beam changing may include changing to a prepared beam. In some aspects, if there is no prepared beam, the lack of a prepared beam may cause an error. The PDCCH 514A may include SPS reactivation DCI to facilitate beam switching. The base station 502 may also transmit a SPS PDSCH 510E to the UE 504. The UE 504 may switch beam and may successfully receive the SPS PDSCH 510E. Upon receiving the SPS PDSCH 510E, the UE 504 may transmit an ACK 512E. The base station 502 may further transmit SPS PDSCHs 510F and 510G using the new beam and the base station 502 may transmit ACKs 512F and 512G upon reception of the SPS PDSCHs 510F and 510G. Beam blocking may further occur and may affect the SPS PDSCH 510H that the base station 502 attempts to transmit. Because of the beam blocking, the UE 504 may transmit a DTX 512H to the base station 502. The base station may further transmit a PDCCH 514B to facilitate beam changing between the base station 502 and the UE 504 and transmit a SPS PDSCH 510I. If the new beam is blocked (which may cause the UE 504 to be unable to receive the SPS PDSCH 510I), the UE 504 may attempt to transmit a NACK 512I to the base station 502.

Figure 6:
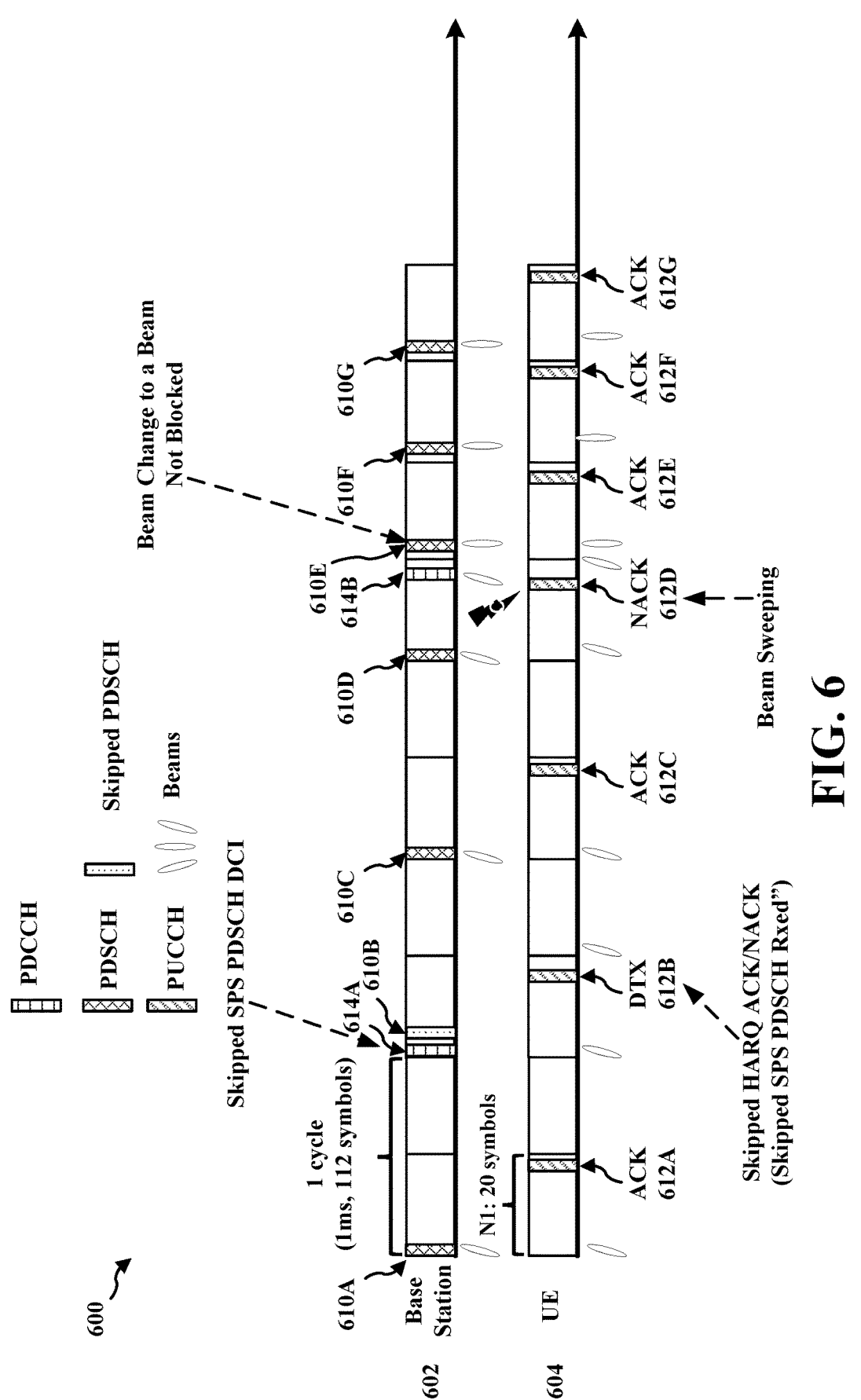
FIG. 6 illustrates an example communication between a base station and a UE.

In some aspects, as illustrated in example 600 of FIG. 6, the base station 602 may transmit a skipped SPS PDSCH DCI 614A to indicate to the UE 604 that one or more SPS PDSCHs will be skipped.

After the base station 602 transmits a SPS PDSCH 610A to the UE 604, the UE 604 may transmit a HARQ feedback indicating ACK 612A to the base station 602. When the base station determines to skip one or more SPS PDSCHs, the base station 602 may transmit a skipped SPS PDSCH DCI 614A to indicate to the UE 604 that one or more SPS PDSCHs will be skipped. In some aspects, the skipped SPS PDSCH DCI 614A may be transmitted in a multi-beam transmission to ensure ultra-high reliability. The skipped SPS PDSCH DCI 614A may include DCI 1_0 or DCI 1_1 version with field that indicates that the SPS PDSCH is not transmitted in a particular transmission occasion. For example, the field may be referred to as a "skipped SPS PDSCH" field, herein. However, the field may be referred to by other names, as well. In some aspects, the skipped SPS PDSCH DCI 614A may include a request of feedback type requesting HARQ ACK/NACK feedback or DTX feedback. For example, the request may indicate DTX type when the skipped SPS PDSCH is not SPS PDSCH from all SPS configurations and otherwise indicate HARQ ACK/NACK. In some aspects, the UE may transmit a HARQ feedback for reception of the SPS PDSCH DCI 614A.

Therefore, after the base station 602 skips a SPS PDSCH 610B, the UE 504 may be aware that the SPS PDSCH 610B would be skipped. The UE 604 may still transmit a DTX 612B to the base station 602 and skip the HARQ feedback.

The base station 602 may transmit subsequent SPS PDSCH 610C to the UE 604 and the UE 604 may transmit an ACK 612C in response to receiving the SPS PDSCH 610C. A downlink transmission/reception beam used for transmission between the UE 604 and the base station 602 may be blocked due to a variety of reasons such as UE movement, interference, channel condition change, or the like. As the base station 602 attempts to transmit the SPS PDSCH 610D, the UE 604 may be unable to receive the SPS PDSCH 610D due to beam blocking. The UE 604 may transmit a NACK 612D to the base station 502 because the UE 504 did not receive the SPS PDSCH 510D. The UE 604 may perform beam sweeping with the base station 602 to facilitate beam switching. Compared with the example illustrated in FIG. 5, the new beam to be switched to might prepared or not prepared. The UE 604 is aware that the SPS PDSCH 610D was not intended to be skipped because it was not indicated to be skipped in the skipped SPS PDSCH DCI 614A. Therefore, the UE 604 may start performing beam sweeping with the base station 602 in addition to transmitting the NACK 612D. If the switching to a new beam is successful (i.e., not blocked), the base station 602 may further transmit SPS PDCCH 614B and SPS PDSCHs 610E, 610F, and 610G to the UE 604; and the UE 604 may transmit ACKs 612E, 612F, and 612G responsive to receiving the SPS PDSCHs 610E, 610F, and 610G.

Figure 7:
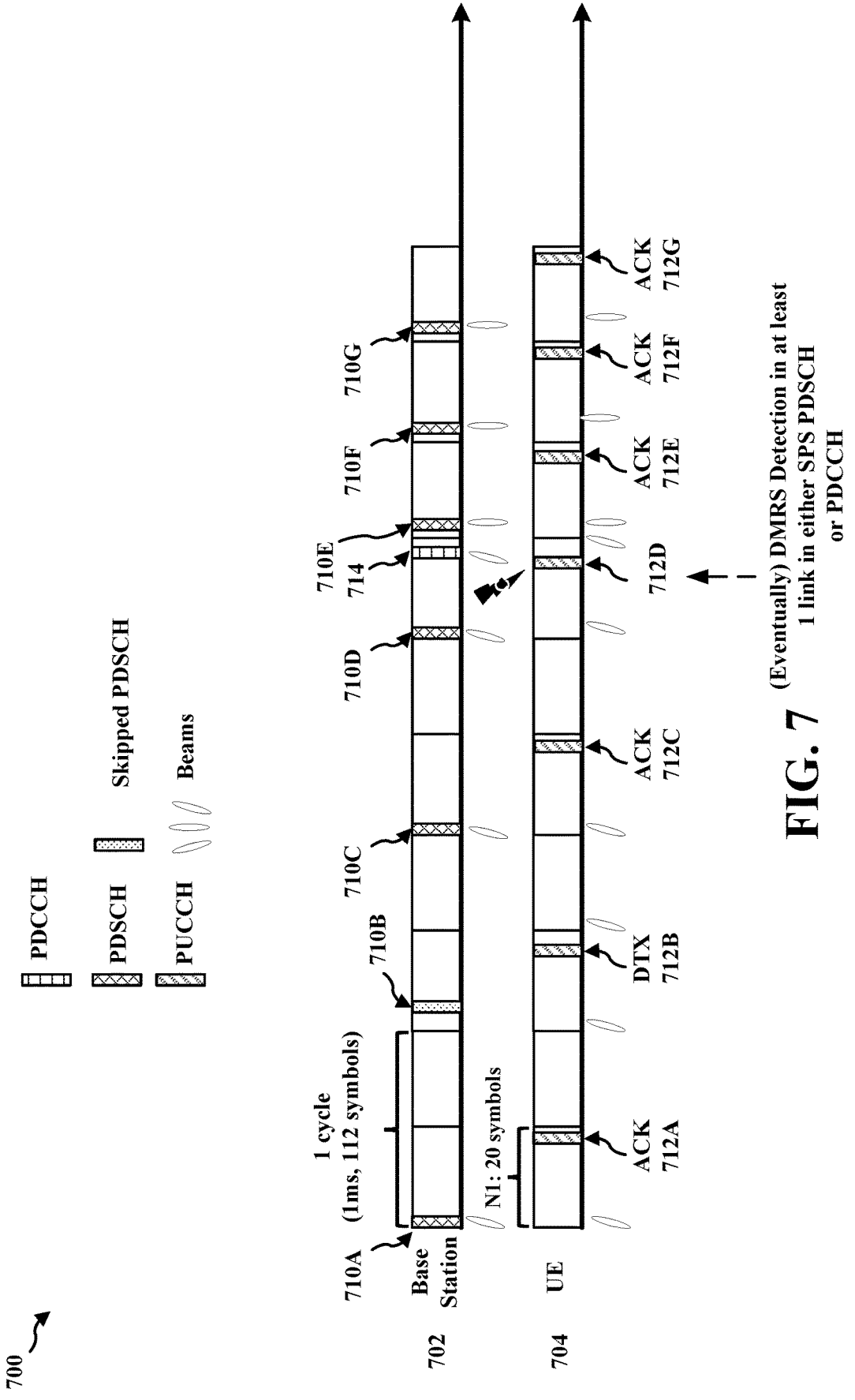
FIG. 7 illustrates an example communication between a base station and a UE.

In some aspects, as illustrated in example 700 of FIG. 7, the frequencies used for the communication between a base station 702 and a UE 704 may be within a range that blocking is not too prevalent (e.g., for frequencies up to 6 Giga-Hertz). The downlink between the base station 702 and the UE 704 may be overloaded and a skipped SPS PDSCH DCI may be too resource consuming to be implemented.

After the base station 702 transmits a SPS PDSCH 710A to the UE 704, the UE 704 may transmit a HARQ feedback indicating ACK 712A to the base station 702. After the base station 702 skips a SPS PDSCH 710B, the UE 704 may transmit a DTX 712B to the base station 702 and skip the HARQ feedback. The UE 704 may determine that the base station 702 has skipped SPS PDSCH 710B using a variety of parameters. For example, the UE 704 may determine that the base station 702 has skipped SPS PDSCH 710B based on no SPS PDSCH demodulation reference signal (DMRS) detection in one or more links (for multi-link SPS PDSCH). The UE 704 may determine that the base station 702 has skipped SPS PDSCH 710B further based on no PDCCH DMRS detection in the one or more links. For example, the UE 704 may determine that the base station 702 has skipped SPS PDSCH 710B based on the combination of no SPS PDSCH DMRS and no PDCCH DMRS.

The base station 702 may transmit subsequent SPS PDSCH 710C to the UE 704 and the UE 704 may transmit an ACK 712C in response to receiving the SPS PDSCH 710C. A downlink transmission/reception beam used for transmission between the UE 704 and the base station 702 may be blocked due to a variety of reasons such as UE movement, interference, channel condition change, or the like. The UE 704 may detect DMRS in either SPS PDSCH 710D or a PDCCH 714 and may accordingly transmit a HARQ feedback 712D. The downlink transmission/reception beam between the base station 702 and UE 704 may change. After the beam changes, the base station 702 may further transmit SPS PDSCHs 710E, 710F, and 710G to the UE 704 and the UE 704 may transmit ACKs 712E, 712F, and 712G responsive to receiving the SPS PDSCHs 710E, 710F, and 710G.

In various aspects of described herein, a base station may transmit, to a UE, DCI that includes an indication of one or more skipped SPS PDSCH occurrences. In some aspects, the base station may schedule a downlink transmission at an SPS PDSCH occurrence of a plurality of SPS PDSCH occurrences, where remaining SPS PDSCH occurrences from the plurality of SPS PDSCH occurrences may correspond to the one or more skipped SPS PDSCH occurrences. In some aspects, the one or more skipped SPS PDSCH occurrences may be associated with one or more component carriers, one or more SPS configurations, and/or a single traffic flow between the UE and the base station. In some aspects, the one or more skipped SPS PDSCH occurrences may be associated with a primary cell or one or more secondary cells.

In some aspects, the UE may receive the DCI that includes the indication of the one or more skipped SPS PDSCH occurrences, and the UE may perform a communication with the base station at one or more of the one or more skipped SPS PDSCH occurrences. In some aspects, the communication may be a discontinuous transmission. In some aspects, the communication may not be a HARQ ACK/NACK feedback.

In some aspects, transmitting DCI that indicates a skipped SPS PDSCH occurrence may reduce a power consumption at the UE, as the UE may not transmit a HARQ ACK/NACK feedback because of the skipped SPS PDSCH occurrence. In some aspects, transmitting the DCI that indicates the skipped SPS PDSCH occurrence may reduce uplink interference and provide additional available uplink resources with respect to other UEs.

In some aspects, the UE may perform a skipped PDSCH SPS occurrence detection based at least in part on a defined DMRS. However, using the defined DMRS to perform the skipped PDSCH SPS occurrence detection may increase power consumption at the UE, as compared to transmitting the DCI that may indicate multiple skipped PDSCH SPS occurrences. Further, using the defined DMRS to perform the skipped PDSCH SPS occurrence detection may use an additional DMRS port.

Figure 8:
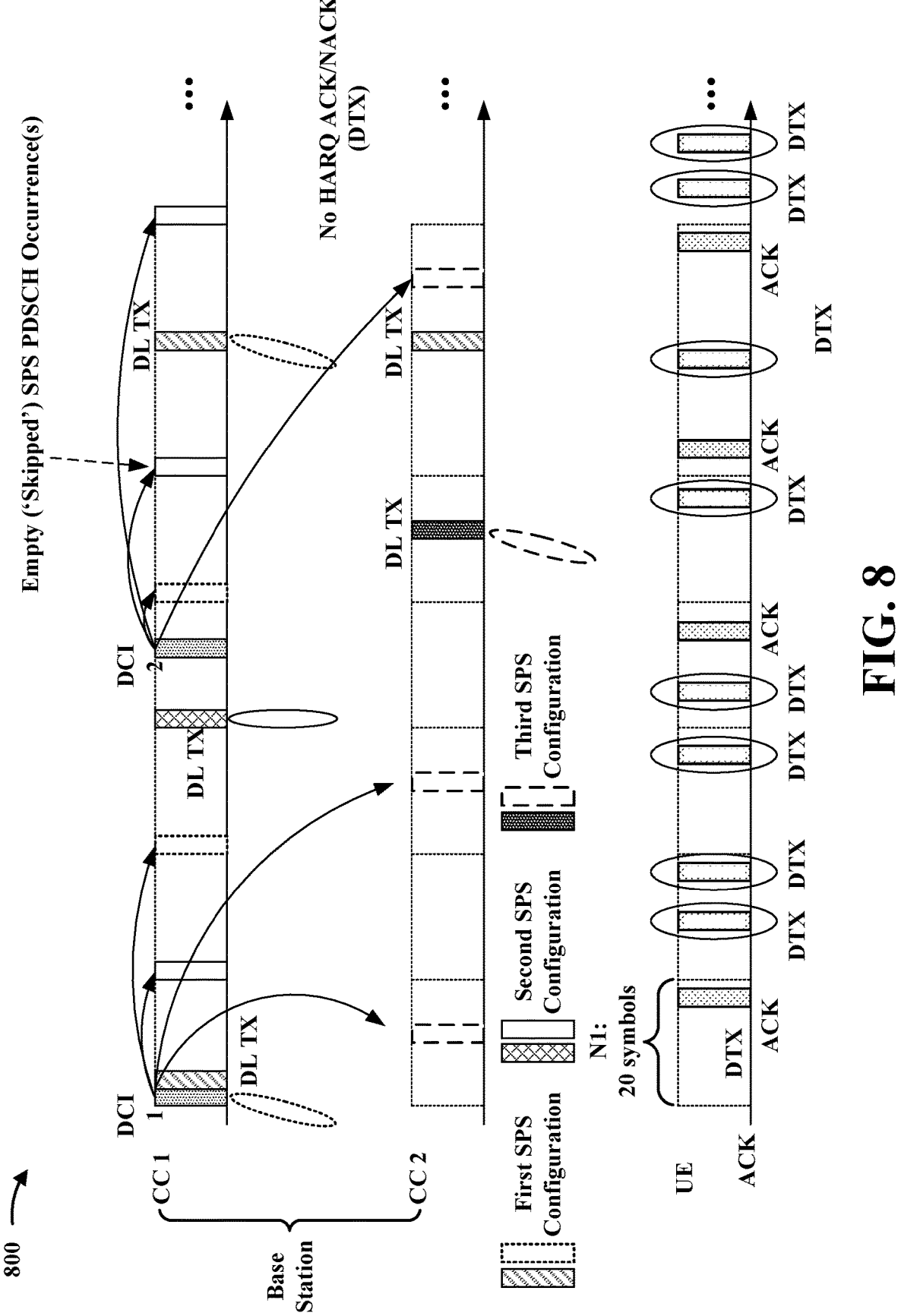
FIGS. 8-11 are diagrams illustrating examples associated with transmitting an indication of an SPS PDSCH occurrence, in accordance with various aspects of the present disclosure.

FIG. 8 is a diagram illustrating an example 800 associated with transmitting an indication of an SPS PDSCH occurrence. As shown in FIG. 8, a base station (e.g., base station 180) may be configured with a plurality of SPS PDSCH occurrences. The plurality of SPS PDSCH occurrences may be configured to improve reliability and reduce latency. The plurality of SPS PDSCH occurrences may be associated with one or more component carriers and/or SPS configurations. In the example shown in FIG. 8, a first set of SPS PDSCH occurrences may be associated with a first SPS configuration in a first component carrier (CC1), a second set of SPS PDSCH occurrences may be associated with a second SPS configuration in the first component carrier, and a third second set of SPS PDSCH occurrences may be associated with a third SPS configuration in a second component carrier (CC2). In this example, the first component carrier may be associated with two SPS configurations, and the second component carrier may be associated with one SPS configuration.

In some aspects, the base station may perform a downlink transmission on one or more SPS PDSCH occurrences from the plurality of SPS PDSCH occurrences. For example, the base station may schedule downlink transmission(s) to occur in one or more upcoming SPS PDSCH occurrences. In the example shown in FIG. 8, the base station may perform downlink transmission(s) in one or more SPS PDSCH occurrences associated with the first SPS configuration. The base station may perform downlink transmission(s) in one or more SPS PDSCH occurrences associated with the second SPS configuration. The base station may perform downlink transmission(s) in one or more SPS PDSCH occurrences associated with the third SPS configuration. The base station may not perform downlink transmissions on remaining SPS PDSCH occurrences of the plurality of SPS PDSCH occurrence. In this case, the remaining SPS PDSCH occurrences may be skipped (or empty) SPS PDSCH occurrences. Skipped SPS PDSCH occurrences may occur for multiple SPS configurations for a single traffic flow (e.g., a single traffic flow between the UE and the base station).

In the example shown in FIG. 8, the first SPS configuration may be associated with a first set of skipped SPS PDSCH occurrences, the second SPS configuration may be associated with a second set of skipped SPS PDSCH occurrences, and the third SPS configuration may be associated with a third set of skipped SPS PDSCH occurrences.

In some aspects, the base station may transmit DCI that includes an indication of the one or more skipped SPS PDSCH occurrences. The indication may be for one or more skipped SPS PDSCH occurrences in one or more component carriers. The indication may be for one or more skipped SPS PDSCH occurrences associated with one or more SPS configurations. In some aspects, the base station may transmit multiple DCIs that correspond to a particular set of skipped SPS PDSCH occurrences.

In the example shown in FIG. 8, the base station may transmit a first DCI that include s an indication of skipped PDSCH occurrences for the first component carrier and the second component carrier. The first DCI may indicate the skipped PDSCH occurrences with respect to the first SPS configuration, the second SPS configuration, and the third SPS configuration. Further, the base station may transmit a second DCI that includes an indication of skipped PDSCH occurrences for the first component carrier and the second component carrier. The first DCI may indicate the skipped PDSCH occurrences with respect to the first SPS configuration, the second SPS configuration, and the third SPS configuration.

In some aspects, the UE may receive the DCI(s) from the base station. The UE may identify the one or more skipped SPS PDSCH occurrences based at least in part on the DCI(s) received from the base station. As a result, the UE may not transmit HARQ ACK/NACK feedback for a given skipped SPS PDSCH occurrence. The UE may instead perform a communication, such as a discontinuous transmission, at the skipped SPS PDSCH occurrence. The communication performed by the UE during the skipped SPS PDSCH occurrence may be an uplink communication or a downlink communication. Therefore, the UE may not perform HARQ ACK/NACK feedback signaling that may be unnecessary based at least in part on the skipped SPS PDSCH occurrence. The UE may thus avoid wasting power due to unnecessary signaling of the HARQ ACK/NACK feedback. The UE may thus avoid causing uplink interference to other UEs due to unnecessary signaling of the HARQ ACK/NACK feedback. Further, the UE may use symbols, that would otherwise be used to perform unnecessary HARQ ACK/NACK feedback signaling, for uplink or downlink communications with the base station, thereby improving a throughput.

Figure 9:
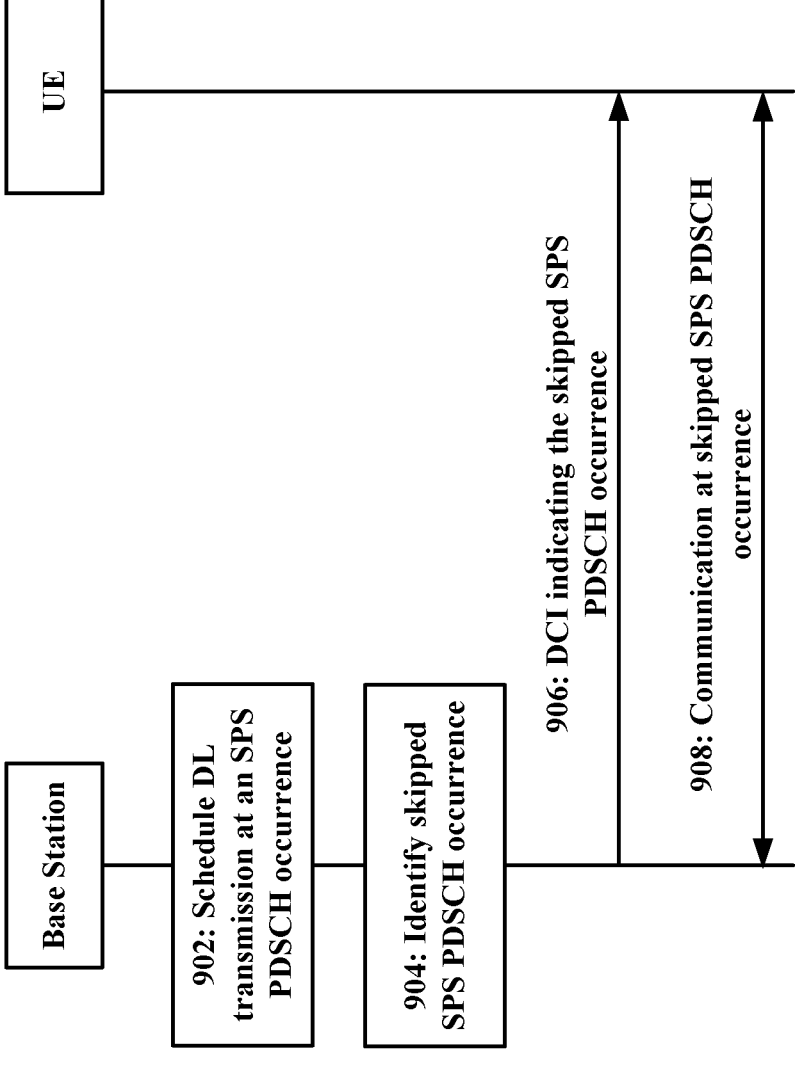

FIG. 9 is a diagram illustrating an example 900 associated with transmitting an indication of an SPS PDSCH occurrence, in accordance with various aspects of the present disclosure. As shown in FIG. 9, example 900 includes communication between a UE (e.g., UE 104) and a base station (e.g., base station 180). In some aspects, the UE and the base station may be included in a wireless network. The UE and the base station may communicate on a wireless sidelink.

At 902, the base station may schedule a downlink transmission at an SPS PDSCH occurrence of a plurality of SPS PDSCH occurrences. The base station may schedule the downlink transmission at an upcoming SPS PDSCH occurrence. The SPS PDSCH occurrence may be associated with a certain component carrier. The SPS PDSCH occurrence may be associated with a certain SPS configuration. The SPS PDSCH occurrence may be associated with a primary cell or a secondary cell.

In some aspects, the base station may schedule downlink transmissions proactively for a multiple of cycles. An indication of the scheduling for the multiple of cycles may be transmitted by the base station to neighbor base stations, which may enable the neighbor base stations to perform scheduling accordingly. In other words, the base station may perform preemptive scheduling for the multiple of cycles, and the base station may share scheduling decisions and information with other base stations, such as the neighbor base stations.

At 904, the base station may identify one or more skipped SPS PDSCH occurrences based at least in part on the SPS PDSCH occurrence scheduled to be used for the downlink transmission. In some aspects, remaining SPS PDSCH occurrences from the plurality of SPS PDSCH occurrences (e.g., SPS PDSCH occurrences during which the downlink transmission is not scheduled) may correspond to the one or more skipped SPS PDSCH occurrences. The one or more skipped SPS PDSCH occurrences may be skipped or empty because the base station does not use these SPS PDSCH occurrences for downlink transmissions. The one or more skipped SPS PDSCH occurrences may be associated with one or more component carriers. The one or more skipped SPS PDSCH occurrences may be associated with one or more SPS configurations. The one or more skipped SPS PDSCH occurrences may be associated with a primary cell and/or one or more secondary cells. The one or more skipped SPS PDSCH occurrences may be associated with a single traffic flow between the UE and the base station.

At 906, the base station may transmit, to the UE, DCI that includes an indication of the one or more skipped SPS PDSCH occurrences. The DCI may indicate the one or more skipped SPS PDSCH occurrences in the one or more component carriers. The DCI may indicate the one or more skipped SPS PDSCH occurrences in the one or more SPS configurations. The DCI may indicate the one or more skipped SPS PDSCH occurrences in the primary cell and/or the secondary cell(s).

In some aspects, the base station may transmit the DCI based at least in part on a beam sweeping. For example, the base station may perform beam sweeping to improve a reliability of a DCI transmission that includes the indication of the one or more skipped SPS PDSCH occurrences. In some aspects, the base station may transmit the DCI based at least in part on feedback received from the UE. For example, the base station may receive, from a UE, feedback associated with a previous DCI reception, and the base station may use the feedback to improve the reliability of the DCI transmission that includes the indication of the one or more skipped SPS PDSCH occurrences.

In some aspects, the UE may receive the DCI that includes the indication of the one or more skipped SPS PDSCH occurrences. Based on the indication, the UE may be notified that no downlink transmission may be received from the base station at the one or more skipped SPS PDSCH occurrences.

At 908, the UE may perform a communication with the base station at one or more of the one or more skipped SPS PDSCH occurrences. The communication may be an uplink communication or a downlink communication. The communication may be a discontinuous transmission from the UE. The communication may not be a HARQ ACK/NACK feedback (e.g., a NACK), since the UE may not expect to receive a PDSCH during the indicated skipped SPS PDSCH occasions.

In some aspects, one or more active configurations or resources may be associated with a traffic flow between the UE and the base station. The base station may transmit, to the UE, an indication of the one or more active configurations or resources to be used for a time period (e.g., a cycle). In a specific example, the cycle may be associated with a duration of 1 millisecond, and the cycle may include 112 symbols.

Figure 10:
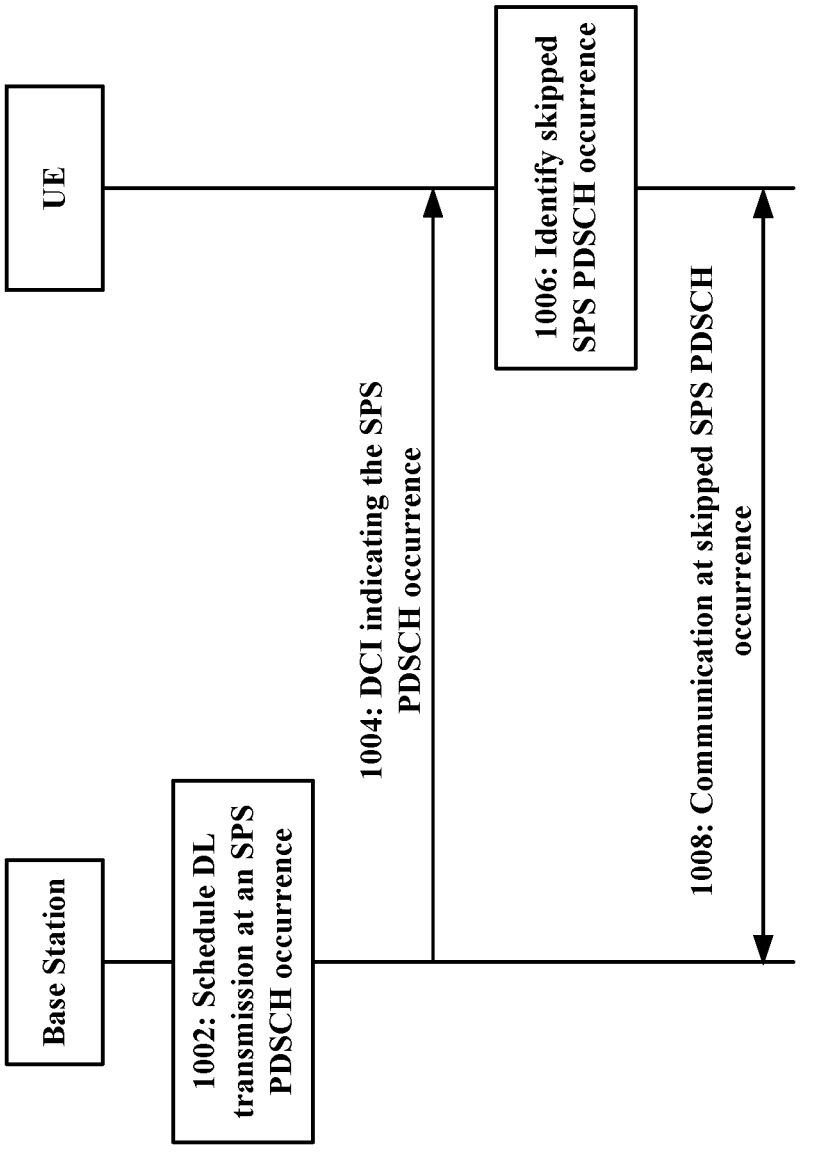

FIG. 10 is a diagram illustrating an example 1000 associated with transmitting an indication of an SPS PDSCH occurrence, in accordance with various aspects of the present disclosure. As shown in FIG. 10, example 1000 includes communication between a UE (e.g., UE 104) and a base station (e.g., base station 180). In some aspects, the UE and the base station may be included in a wireless network. The UE and the base station may communicate on a wireless sidelink.

At 1002, the base station may schedule a downlink transmission at an SPS PDSCH occurrence of a plurality of SPS PDSCH occurrences. The SPS PDSCH occurrence may be associated with a certain component carrier. The SPS PDSCH occurrence may be associated with a certain SPS configuration. The SPS PDSCH occurrence may be associated with a primary cell or a secondary cell.

At 1004, the base station may transmit, to the UE, DCI that includes an indication of the SPS PDSCH occurrence to be used by the base station. In other words, the DCI may indicate the SPS PDSCH occurrence that has been scheduled by the base station for the downlink transmission from the base station to the UE.

At 1006, the UE may identify one or more skipped SPS PDSCH occurrences based at least in part on the SPS PDSCH occurrence indicated in the DCI. In other words, the UE may assume that remaining SPS PDSCH occurrences in a plurality of SPS PDSCH occurrences (e.g., SPS PDSCH occurrences during which the downlink transmission is not scheduled) may correspond to the one or more skipped SPS PDSCH occurrences. The one or more skipped SPS PDSCH occurrences may be skipped or empty because the base station does not use these SPS PDSCH occurrences for downlink transmissions. The one or more skipped SPS PDSCH occurrences may be associated with one or more component carriers. The one or more skipped SPS PDSCH occurrences may be associated with one or more SPS configurations. The one or more skipped SPS PDSCH occurrences may be associated with a primary cell and/or one or more secondary cells. The one or more skipped SPS PDSCH occurrences may be associated with a single traffic flow between the UE and the base station. At 1008, the UE may perform a communication with the base station at one or more skipped SPS PDSCH occurrences. In other words, the UE may perform the communication at the one or more skipped SPS PDSCH occurrences that do not correspond to the SPS PDSCH occurrence indicated in the DCI. The communication may be an uplink communication or a downlink communication. The communication may be a discontinuous transmission from the UE. The communication may not be a HARQ ACK/NACK feedback (e.g., a NACK), since the UE may not expect to receive a PDSCH during the indicated skipped SPS PDSCH occasions.

Figure 11:
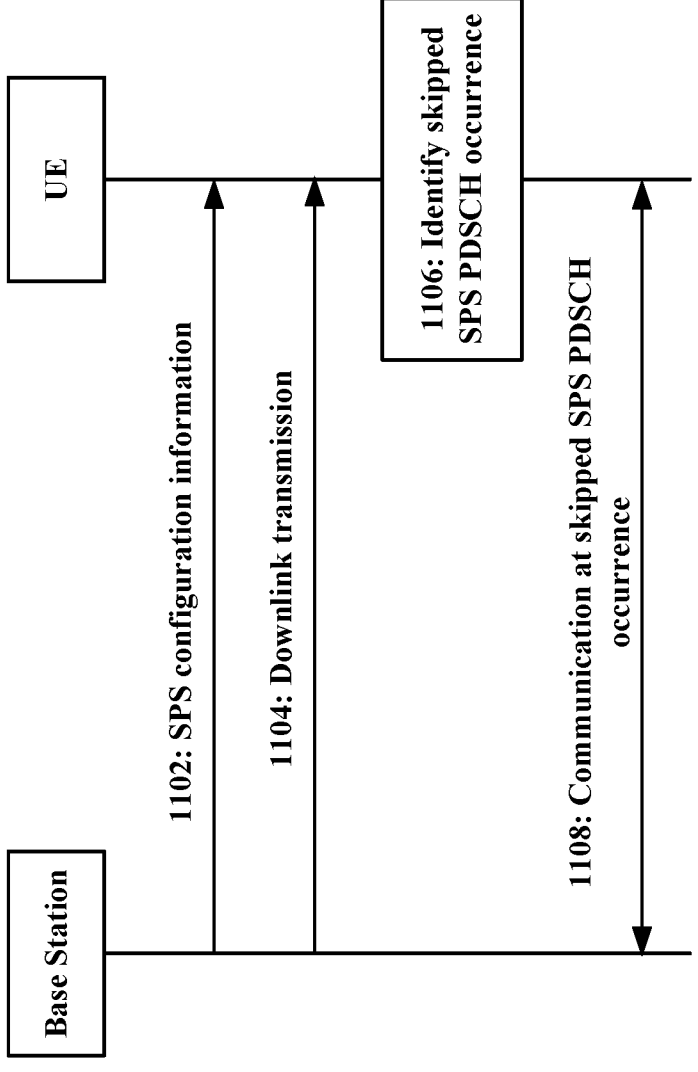

FIG. 11 is a diagram illustrating an example 1100 associated with transmitting an indication of an SPS PDSCH occurrence, in accordance with various aspects of the present disclosure. As shown in FIG. 11, example 1100 includes communication between a UE (e.g., UE 104) and a base station (e.g., base station 180). In some aspects, the UE and the base station may be included in a wireless network. The UE and the base station may communicate on a wireless sidelink.

At 1102, the base station may transmit to the UE SPS configuration information that configures a single SPS configuration from a plurality of active SPS configurations. The SPS configuration information may indicate to the UE that the single SPS configuration is to be used by the base station, and remaining SPS configurations from the plurality of active SPS configurations may not be used by the base station.

At 1104, the base station may transmit to the UE a downlink transmission at an SPS PDSCH occurrence associated with the single SPS configuration from the plurality of active SPS configurations.

At 1106, the UE may perform a communication at one or more skipped SPS PDSCH occurrences associated with one or more of the single SPS configuration or the remaining SPS configurations from the plurality of active SPS configurations. In other words, after receiving the downlink transmission at the SPS PDSCH occurrence associated with the single SPS configuration, the UE may determine that the remaining SPS configurations are not used by the base station. Further, for the remaining SPS configurations, the UE may identify the one or more skipped SPS PDSCH occurrences. As a result, the UE may use the one or more skipped SPS PDSCH occurrences to perform the communication with the base station.

As an example, the SPS configuration information may indicate that one SPS PDSCH transmission is performed per cycle, such as an industrial IoT cycle. For example, one SPS configuration may be used among three activated SPS configurations per the cycle. In other words, multiple SPS configurations may be configured, but the one SPS configuration may be used per cycle. When the base station transmits downlink traffic in an SPS PDSCH occurrence via a first-in-time SPS configuration (e.g., the one SPS configuration indicated in the SPS configuration information), the base station may not transmit DCI to the UE indicating skipped SPS PDSCH occurrences because the UE may assume that the remaining two activated SPS configurations in the cycle are skipped or empty. In other words, the UE may determine that SPS PDSCH occurrences associated with the remaining two activated SPS configurations in the cycle are skipped or empty. In this example, the UE may not receive DCI from the UE that explicitly indicates the skipped SPS PDSCH occurrences.

In another example, the SPS configuration information may indicate N SPS PDSCH transmissions among M SPS configurations per cycle. For example, the SPS configuration may indicate two SPS transmissions (for redundancy) upon each three SPS configurations per cycle. Based at least in part on the SPS configuration information, the UE may identify skipped SPS PDSCH occurrences which may be used to perform communications with the base station.

FIG. 12 is a flowchart 1200 of a method of wireless communication. The method may be performed by a UE (e.g., the UE 104; the UE 404, 504, 604, 704, or the like). The method may be used for reducing signaling overhead and improving reliability and throughput for a UE.

At 1202, the UE may determine that a base station skips one or more SPS PDSCH. For example, the determination may be performed by SPS PDSCH skipping determination component 1642. In some aspects, the determination is based on an absence of a detected SPS PDSCH DMRS. In some aspects, the determination is based on the absence of a detected PDCCH DMRS.

At 1204, the UE may skip transmission of a HARQ feedback for the one or more SPS PDSCH occurrences. For example, the skipping may be performed by HARQ skipping component 1644. The skipping 1204 may include aspects described in connection with 612B of FIGS. 6 and 712B of FIG. 7. In some aspects, the skipping may include transmitting a DTX to the base station.

FIG. 13 is a flowchart 1300 of a method of wireless communication. The method may be performed by a UE (e.g., the UE 104; the UE 404, 504, 604, 704, or the like).

The method may be used for reducing signaling overhead and improving reliability and throughput for a UE.

At 1302, the UE may determine that a base station skips one or more SPS PDSCH. For example, the determination may be performed by SPS PDSCH skipping determination component 1642. In some aspects, the determination is based on an absence of a detected SPS PDSCH DMRS. In some aspects, the determination is based on the absence of a detected PDCCH DMRS. In some aspects, to facilitate the determination at 1302, the UE may, at 1303, receive an indication that the base station will skip the SPS PDSCH in DCI from a base station. The DCI that includes the indication that the base station will skip the SPS PDSCH may be received in a multi-beam transmission. The DCI may include a DCI format 1_0 or a DCI format 1_1. In some aspects, the DCI indicates a request for the HARQ feedback. In some aspects, the UE may transmit the HARQ feedback for the DCI (e.g., for reception of the DCI) and skip HARQ feedback for the SPS PDSCH. In some aspects, to facilitate the determination at 1302, the UE may, at 1305, receive multiple SPS configurations for PDSCH having bundled HARQ feedback. The DCI may indicate that the base station will skip the SPS PDSCH for one or more of the multiple SPS configurations.

At 1304, the UE may skip transmission of a HARQ feedback for the one or more SPS PDSCH occurrences. For example, the skipping may be performed by HARQ skipping component 1644. The skipping 1304 may include aspects described in connection with 612B of FIGS. 6 and 712B of FIG. 7. In some aspects, the skipping may include transmitting a DTX to the base station.

At 1306, in some aspects, the UE may determine a blocked beam for a SPS PDSCH. For example, the determination may be performed by blocked beam determination component 1646. The determining 1306 may include aspects described in connection with 612D of FIG. 6.

In some aspects, at 1308, the UE transmits the HARQ feedback based on the blocked beam for the SPS PDSCH. For example, the reception may be performed by HARQ transmission component 1648. The transmission 1308 may include aspects described in connection with 612D of FIG. 6. The UE may also perform beam sweeping at 1310 based on the blocked beam for the SPS PDSCH.

In some aspects, at 1312, the UE may transmit, to the base station, a communication at one or more of the one or more SPS PDSCH occurrences. The transmission 1310 may be performed by the transmission component 1634 of FIG. 16. In some aspects, the transmission 1312 may include aspects described in connection with 908 of FIG. 9, 1008 of FIG. 10, and 1108 of FIG. 11. In some aspects, the communication transmitted to the base station at the one or more SPS PDSCH occurrences is a discontinuous transmission. In some aspects, the one or more skipped SPS PDSCH occurrences are associated with one or more component carriers. In some aspects, the one or more SPS PDSCH occurrences are associated with one or more SPS configurations. In some aspects, the one or more SPS PDSCH occurrences are associated with a primary cell or one or more secondary cells. In some aspects, the one or more SPS PDSCH occurrences are associated with a single traffic flow with the base station. In some aspects, the communication at the one or more SPS PDSCH occurrences does not correspond with a SPS PDSCH occurrence indicated in a DCI. In some aspects, the communication at the one or more SPS PDSCH occurrences is associated with a SPS configuration from a plurality of active SPS configurations, the SPS configuration being indicated by the base station. In some aspects, the communication at the one or more SPS PDSCH occurrences is associated one or more remaining SPS configurations from a plurality of active SPS configurations that is different from a SPS configuration indicated by the base station.

Figure 14:
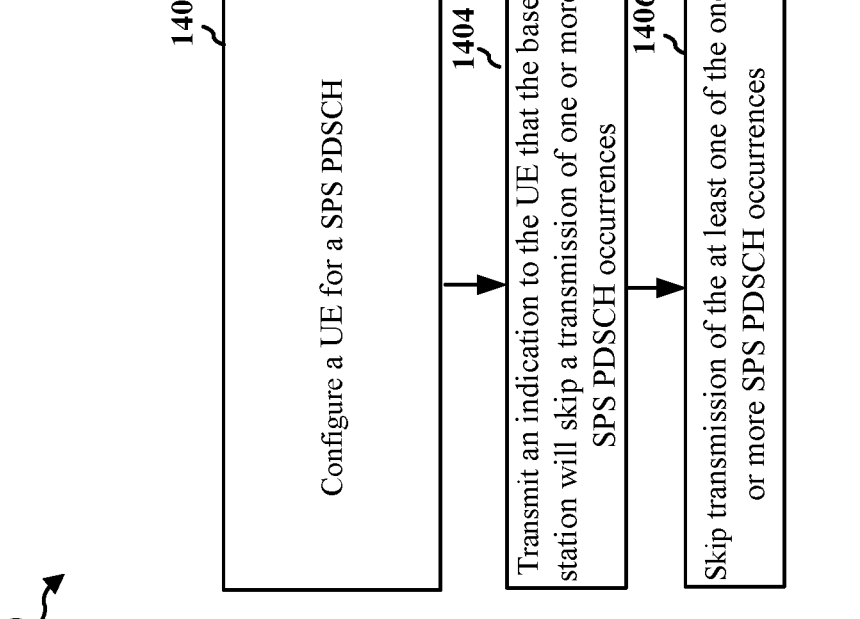
FIG. 14 is a flowchart of a method of wireless communication at a base station.

FIG. 14 is a flowchart 1400 of a method of wireless communication. The method may be performed by a base station (e.g., the base station 142/180; the base station 402, 502, 602, 702, or the like). The method may be used for reducing signaling overhead and improving reliability and throughput for a UE.

At 1402, the base station configures a UE for a SPS PDSCH. For example, the configuring may be performed by SPS PDSCH configuration component 1742 of FIG. 17. The configuring 1402 may include aspects described in connection with 610A of FIGS. 6 and 710A of FIG. 7.

At 1404, the base station transmits an indication to the UE that the base station will skip a transmission of one or more SPS PDSCH occurrences. For example, the skipping may be performed by indication transmission component 1744 of FIG. 17. The transmission 1404 may include aspects described in connection with 614A of FIG. 6. In some aspects, the indication may be transmitted in a DCI. In some aspects, the DCI including the indication that the base station will skip the SPS PDSCH is transmitted in a multi-beam transmission. In some aspects, the DCI comprises a DCI format 1_0 or a DCI format 1_1. In some aspects, the DCI indicates a request for the HARQ feedback and the base station may receive the HARQ feedback for the DCI (e.g., for reception of the DCI). In some aspects, the base station transmits multiple SPS configurations for PDSCH having bundled HARQ feedback. The DCI indicates that the base station will skip the SPS PDSCH for one or more of the multiple SPS configurations.

At 1406, the base station skips transmission of the one or more SPS PDSCH occurrences. For example, the skipping may be performed by PDSCH skipping component 1746 of FIG. 17. The skipping 1406 may include aspects described in connection with 610B of FIGS. 6 and 710B of FIG. 7. The base station may skip the transmission of the at least one of the one or more SPS PDSCH for a variety of reasons, such as freeing up resources for a transmission of higher priority than the one or more SPS PDSCH.

Figure 15:
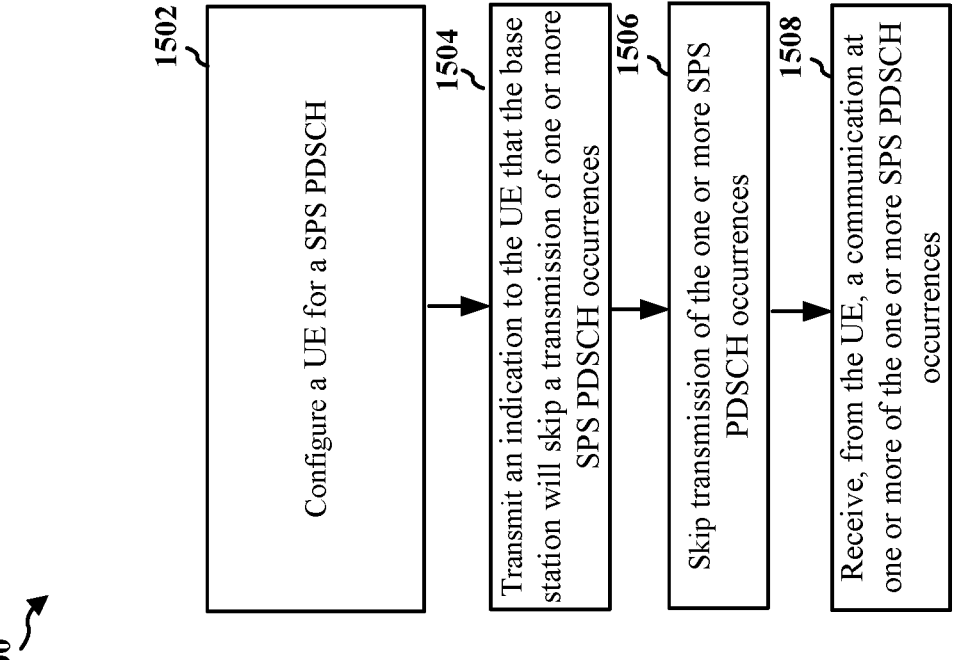
FIG. 15 is a flowchart of a method of wireless communication at a base station.

FIG. 15 is a flowchart 1500 of a method of wireless communication. The method may be performed by a base station (e.g., the base station 102/180; the base station 402, 502, 602, 702, or the like). The method may be used for reducing signaling overhead and improving reliability and throughput for a UE.

At 1502, the base station configures a UE for a SPS PDSCH. For example, the configuring may be performed by SPS PDSCH configuration component 1742. The configuring 1502 may include aspects described in connection with 610A of FIGS. 6 and 710A of FIG. 7.

At 1504, the base station transmits an indication to the UE that the base station will skip a transmission of one or more SPS PDSCH occurrences. For example, the skipping may be performed by indication transmission component 1744. The transmission 1504 may include aspects described in connection with 614A of FIG. 6. In some aspects, the indication may be transmitted in a DCI. In some aspects, the DCI including the indication that the base station will skip the SPS PDSCH is transmitted in a multi-beam transmission. In some aspects, the DCI comprises a DCI format 1_0 or a DCI format 1_1. In some aspects, the DCI indicates a request for the HARQ feedback and the base station may receive the HARQ feedback for the DCI (e.g., for reception of the DCI). In some aspects, the base station transmits multiple SPS configurations for PDSCH having bundled HARQ feedback. The DCI indicates that the base station will skip the SPS PDSCH for one or more of the multiple SPS configurations.

At 1506, the base station skips transmission of the at least one of the one or more SPS PDSCH. For example, the skipping may be performed by PDSCH skipping component 1746. The skipping 1506 may include aspects described in connection with 610B of FIGS. 6 and 710B of FIG. 7. The base station may skip the transmission of the at least one of the one or more SPS PDSCH for a variety of reasons, such as freeing up resources for a transmission of higher priority than the one or more SPS PDSCH.

At 1508, the base station may receive, from the UE, a communication at one or more of the one or more SPS PDSCH occurrences. The reception 1508 may be performed by the reception component 1730.

In some aspects, the reception 1508 may include aspects described in connection with 908 of FIG. 9, 1008 of FIG. 10, and 1708 of FIG. 17. In some aspects, the communication received by the base station at the one or more SPS PDSCH occurrences is a discontinuous transmission. In some aspects, the one or more skipped SPS PDSCH occurrences are associated with one or more component carriers. In some aspects, the one or more SPS PDSCH occurrences are associated with one or more SPS configurations. In some aspects, the one or more SPS PDSCH occurrences are associated with a primary cell or one or more secondary cells. In some aspects, the one or more SPS PDSCH occurrences are associated with a single traffic flow with the base station. In some aspects, the communication at the one or more SPS PDSCH occurrences does not correspond with a SPS PDSCH occurrence indicated in a DCI. In some aspects, the communication at the one or more SPS PDSCH occurrences is associated with a SPS configuration from a plurality of active SPS configurations, the SPS configuration being indicated by the base station. In some aspects, the communication at the one or more SPS PDSCH occurrences is associated one or more remaining SPS configurations from a plurality of active SPS configurations that is different from a SPS configuration indicated by the base station.

Figure 16:
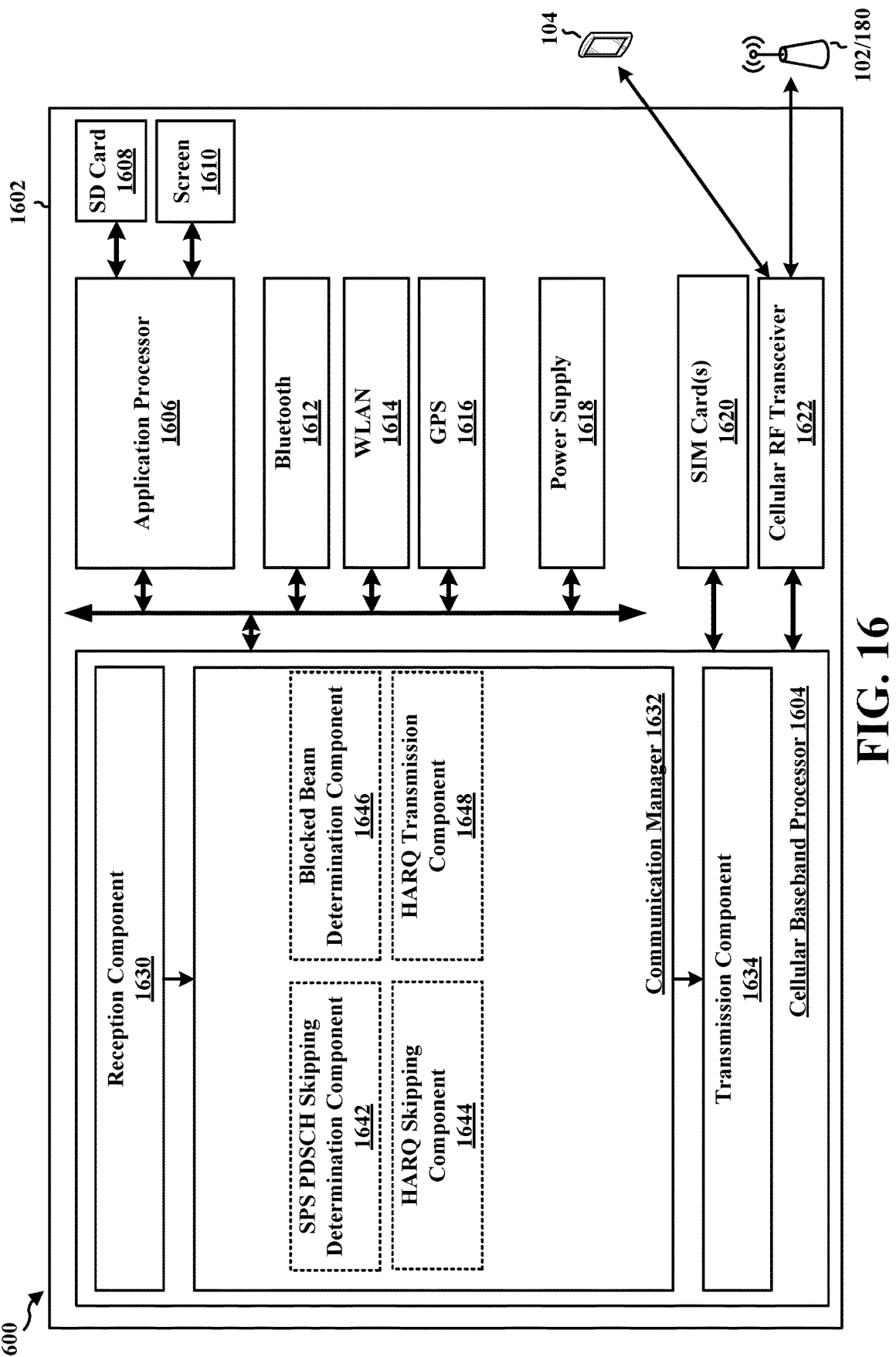
FIG. 16 is a diagram illustrating an example of a hardware implementation for an example apparatus.

FIG. 16 is a diagram 1600 illustrating an example of a hardware implementation for an apparatus 1602. The apparatus 1602 is a UE and includes a cellular baseband processor 1604 (also referred to as a modem) coupled to a cellular RF transceiver 1622 and one or more subscriber identity modules (SIM) cards 1620, an application processor 1606 coupled to a secure digital (SD) card 1608 and a screen 1610, a Bluetooth module 1612, a wireless local area network (WLAN) module 1614, a Global Positioning System (GPS) module 1616, and a power supply 1618. The cellular baseband processor 1604 communicates through the cellular RF transceiver 1622 with the UE 104 and/or BS 102/180. The cellular baseband processor 1604 may include a computer-readable medium/memory. The computer-readable medium/memory may be non-transitory. The cellular baseband processor 1604 is responsible for general processing, including the execution of software stored on the computer-readable medium/memory. The software, when executed by the cellular baseband processor 1604, causes the cellular baseband processor 1604 to perform the various functions described supra. The computer-readable medium/memory may also be used for storing data that is manipulated by the cellular baseband processor 1604 when executing software. The cellular baseband processor 1604 further includes a reception component 1630, a communication manager 1632, and a transmission component 1634. The communication manager 1632 includes the one or more illustrated components. The components within the communication manager 1632 may be stored in the computer-readable medium/memory and/or configured as hardware within the cellular baseband processor 1604. The cellular baseband processor 1604 may be a component of the UE 350 and may include the memory 360 and/or at least one of the TX processor 368, the RX processor 356, and the controller/processor 359. In one configuration, the apparatus 1602 may be a modem chip and include just the cellular baseband processor 1604, and in another configuration, the apparatus 1602 may be the entire UE (e.g., see 350 of FIG. 3) and include the aforediscussed additional modules of the apparatus 1602.

The communication manager 1632 includes a SPS PDSCH skipping determination component 1642 configured to determine that a base station skips one or more SPS PDSCH, such as described in connection with determination 1202 of FIG. 12 and determination 1302 of FIG. 13. The communication manager 1632 further includes a HARQ skipping component 1644 configured to skip transmission of a HARQ feedback for the one or more SPS PDSCH occurrences, such as described in connection with skipping 1204 of FIG. 12 and skipping 1304 of FIG. 13. The communication manager 1632 further includes a blocked beam determination component 1646 configured to determine a blocked beam for a SPS PDSCH, such as described in connection with determining 1306 of FIG. 13. The communication manager 1632 further includes a HARQ transmission component 1648 configured to transmit the HARQ feedback based on the blocked beam for the SPS PDSCH, such as described in connection with transmission 1308 of FIG. 13. The communication manager 1632 may be further configured to cause the transmission component 1634 to transmit, to the base station, a communication at one or more of the one or more SPS PDSCH occurrences, such as described in connection with transmission 1312 of FIG. 13.

The apparatus may include additional components that perform each of the blocks of the algorithm in the aforementioned flowcharts of FIGS. 12-13. As such, each block in the aforementioned flowcharts of FIGS. 12-13 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1602, and in particular the cellular baseband processor 1604, includes means for determining that a base station skips one or more SPS PDSCH. The cellular baseband processor 1604 may further include means for skipping transmission of a HARQ feedback for the one or more SPS PDSCH occurrences. In some aspects, the cellular baseband processor 1604 may further include means for determining a blocked beam for a SPS PDSCH. In some aspects, the cellular baseband processor 1604 may further include means for transmitting the HARQ feedback based on the blocked beam for the SPS PDSCH. In some aspects, the cellular baseband processor 1604 may further include means for receiving an indication that the base station will skip the SPS PDSCH in DCI from the base station. In some aspects, the cellular baseband processor 1604 may further include means for receiving multiple SPS configurations for PDSCH having bundled HARQ feedback. In some aspects, the cellular baseband processor 1604 may further include means for performing a beam sweep. In some aspects, the cellular baseband processor 1604 may further include means for transmitting to the base station, a communication at one or more of the one or more SPS PDSCH occurrences.

The aforementioned means may be one or more of the aforementioned components of the apparatus 1602 configured to perform the functions recited by the aforementioned means. As described supra, the apparatus 1602 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 17:
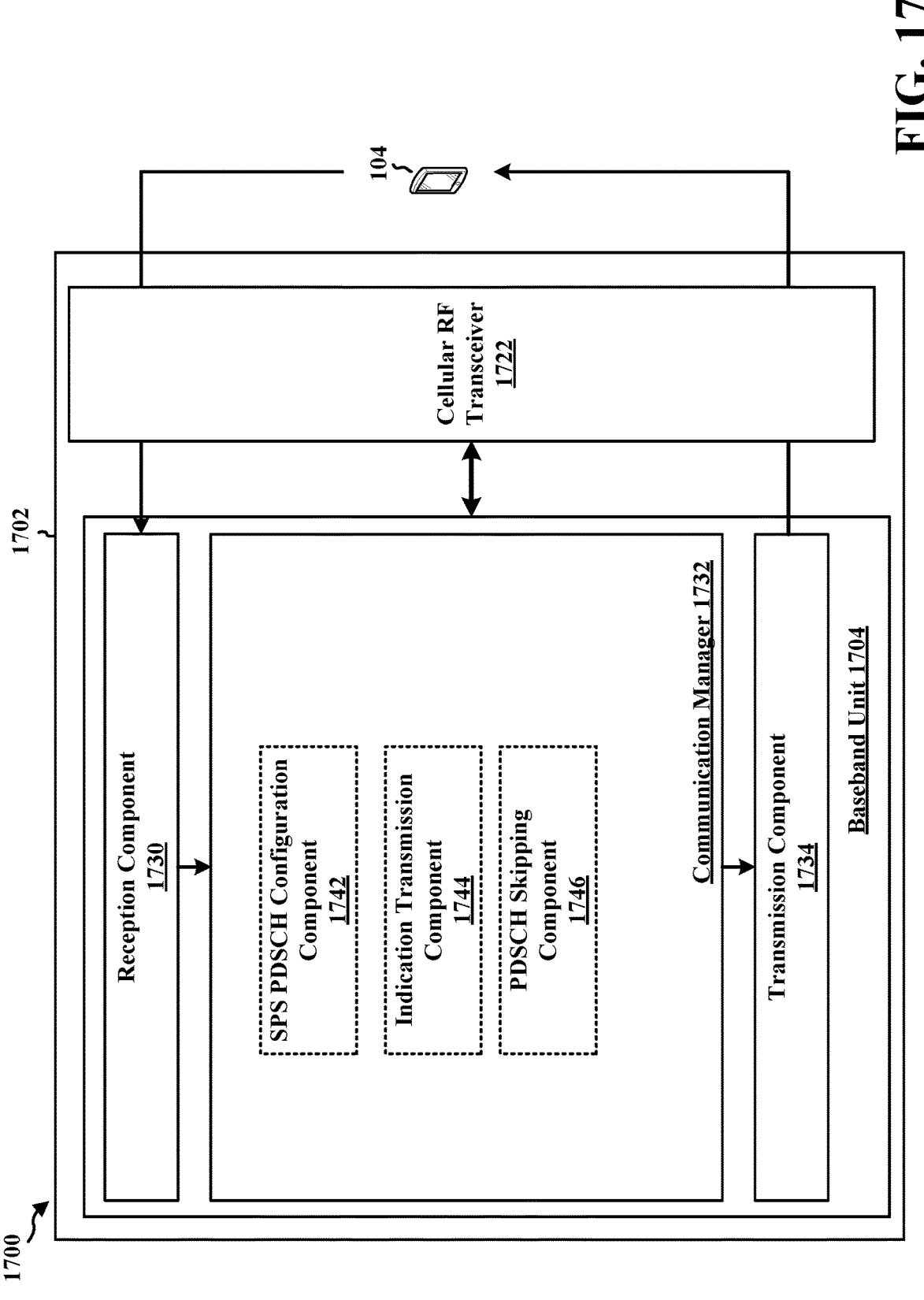
FIG. 17 is a diagram illustrating an example of a hardware implementation for an example apparatus.

FIG. 17 is a diagram 1700 illustrating an example of a hardware implementation for an apparatus 1702. The apparatus 1702 is a BS and includes a baseband unit 1704. The baseband unit 1704 may communicate through a cellular RF transceiver 1722 with the UE 104. The baseband unit 1704 may include a computer-readable medium/memory. The baseband unit 1704 is responsible for general processing, including the execution of software stored on the computer-readable medium/memory. The software, when executed by the baseband unit 1704, causes the baseband unit 1704 to perform the various functions described supra. The computer-readable medium/memory may also be used for storing data that is manipulated by the baseband unit 1704 when executing software. The baseband unit 1704 further includes a reception component 1730, a communication manager 1732, and a transmission component 1734. The communication manager 1732 includes the one or more illustrated components. The components within the communication manager 1732 may be stored in the computer-readable medium/memory and/or configured as hardware within the baseband unit 1704. The baseband unit 1704 may be a component of the base station 310 and may include the memory 376 and/or at least one of the TX processor 316, the RX processor 370, and the controller/processor 375.

The communication manager 1732 includes a SPS PDSCH configuration component 1742 that configures a UE for one or more SPS PDSCH, such as described in connection with configuring 1402 of FIG. 14 and configuring 1502 of FIG. 15. In some aspects, the communication manager 1732 further includes an indication transmission component 1744 that transmits an indication to the UE that the base station will skip a transmission of at least one of the one or more SPS PDSCH, such as described in connection with transmission 1404 of FIG. 14 and transmission 1504 of FIG. 15. In some aspects, the communication manager 1732 further includes a PDSCH skipping component 1746 that skips transmission of the at least one of the one or more SPS PDSCH, such as described in connection with skipping 1406 of FIG. 14 and skipping 1506 of FIG. 15. In some aspects, the communication manager 1732 may cause the reception component 1730 to receive, from the UE, a communication at one or more of the one or more SPS PDSCH occurrences, such as described in connection with 1508 of FIG. 15.

The apparatus may include additional components that perform each of the blocks of the algorithm in the aforementioned flowcharts of FIGS. 14-15. As such, each block in the aforementioned flowcharts of FIGS. 14-15 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

In one configuration, the apparatus 1702, and in particular the baseband unit 1704, includes means for configuring a UE for one or more SPS PDSCH. The baseband unit 1704 further includes means for transmitting an indication to the UE that the base station will skip a transmission of at least one of the one or more SPS PDSCH. The baseband unit 1704 further includes means for skipping transmission of the at least one of the one or more SPS PDSCH. The baseband unit 1704 further includes means for receiving from the UE, a communication at one or more of the one or more SPS PDSCH occurrences. The aforementioned means may be one or more of the aforementioned components of the apparatus 1702 configured to perform the functions recited by the aforementioned means. As described supra, the apparatus 1702 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication of a UE, comprising: a memory; and at least one processor coupled to the memory and configured to: determine that a base station skips one or more SPS PDSCH occurrences; and skip transmission of a HARQ feedback for the one or more SPS PDSCH occurrences.

Aspect 2 is the apparatus of aspect 1, wherein the at least one processor coupled to the memory is further configured to: transmit the HARQ feedback for an SPS PDSCH based on blocked beam for an SPS occurrence of the one or more SPS PDSCH occurrences; and perform beam sweeping based on the blocked beam for the SPS PDSCH.

Aspect 3 is the apparatus of any of aspects 1-2, wherein a determination that the one or more SPS occurrences are skipped is based on an absence of a detected DMRS in a PDSCH after an attempted detection on one or more links.

Aspect 4 is the apparatus of any of aspects 1-3, wherein the determination is further based on the absence of the detected DMRS in a PDCCH after the attempted detection on the one or more links.

Aspect 5 is the apparatus of any of aspects 1-4, wherein a determination that the one or more SPS occurrences are skipped is based on reception of an indication that the base station will skip the SPS PDSCH in DCI from the base station.

Aspect 6 is the apparatus of any of aspects 1-5, wherein the DCI comprises the indication that the base station will skip the SPS PDSCH is received in a multi-beam transmission.

Aspect 7 is the apparatus of any of aspects 1-6, wherein the DCI comprises a DCI format 1_0 or a DCI format 1_1.

Aspect 8 is the apparatus of any of aspects 1-7, wherein the DCI indicates a request for the HARQ feedback, wherein the at least one processor coupled to the memory is further configured to: transmit the HARQ feedback for the DCI and skips the HARQ feedback for the SPS PDSCH.

Aspect 9 is the apparatus of any of aspects 1-8, wherein the at least one processor coupled to the memory is further configured to: receive multiple SPS configurations for PDSCH having bundled HARQ feedback, wherein the DCI indicates that the base station will skip the SPS PDSCH for one or more of the multiple SPS configurations.

Aspect 10 is the apparatus of any of aspects 1-9, wherein the at least one processor coupled to the memory is further configured to: transmit the HARQ feedback if one of the multiple SPS configurations for the PDSCH is not skipped.

Aspect 11 is the apparatus of any of aspects 1-10, wherein the at least one processor coupled to the memory is further configured to: transmit, to the base station, a communication at during at least one of the one or more SPS PDSCH occurrences.

Aspect 12 is the apparatus of any of aspects 1-11, wherein the communication transmitted to the base station at the one or more SPS PDSCH occurrences is a discontinuous transmission.

Aspect 13 is the apparatus of any of aspects 1-12, wherein the one or more SPS PDSCH occurrences are associated with one or more component carriers.

Aspect 14 is the apparatus of any of aspects 1-13, wherein the one or more SPS PDSCH occurrences are associated with one or more SPS configurations.

Aspect 15 is the apparatus of any of aspects 1-14, wherein the one or more SPS PDSCH occurrences are associated with a primary cell or one or more secondary cells.

Aspect 16 is the apparatus of any of aspects 1-15, wherein the one or more SPS PDSCH occurrences are associated with a single traffic flow with the base station.

Aspect 17 is the apparatus of any of aspects 1-16, wherein the communication at the one or more SPS PDSCH occurrences does not correspond with a SPS PDSCH occurrence indicated in a DCI.

Aspect 18 is the apparatus of any of aspects 1-17, wherein the communication at the one or more SPS PDSCH occurrences is associated with an SPS configuration from a plurality of active SPS configurations, the SPS configuration being indicated by the base station.

Aspect 19 is the apparatus of any of aspects 1-18, wherein the communication at the one or more SPS PDSCH occurrences is associated with one or more remaining SPS configurations from a plurality of active SPS configurations that are different from an SPS configuration indicated by the base station.

Aspect 20 is the apparatus of any of aspects 1-19, further comprising a transceiver coupled to the at least one processor.

Aspect 21 is an apparatus for wireless communication of a base station, comprising: a memory; and at least one processor coupled to the memory and configured to: configure a UE for a SPS PDSCH; transmit an indication to the UE that the base station will skip a transmission of one or more SPS PDSCH occurrences; and skip the transmission of the one or more SPS PDSCH occurrences.

Aspect 22 is the apparatus of aspect 21, wherein the indication is transmitted in DCI.

Aspect 23 is the apparatus of any of aspects 21-22, wherein the DCI comprises the indication that the base station will skip the one or more SPS PDSCH occurrences is transmitted in a multi-beam transmission.

Aspect 24 is the apparatus of any of aspects 21-23, wherein the DCI comprises a DCI format 1_0 or a DCI format 1_1.

Aspect 25 is the apparatus of any of aspects 21-24, wherein the DCI indicates a request for a HARQ feedback, wherein the at least one processor coupled to the memory is further configured to receive the HARQ feedback for the DCI.

Aspect 26 is the apparatus of any of aspects 21-25, wherein the at least one processor coupled to the memory is configured to transmit multiple SPS configurations for PDSCH having bundled HARQ feedback, wherein the DCI indicates that the base station will skip the one or more SPS PDSCH occurrences for one or more of the multiple SPS configurations.

Aspect 27 is the apparatus of any of aspects 21-26, wherein the at least one processor coupled to the memory is further configured to: receive, from the UE, a communication during at least one of the one or more SPS PDSCH occurrences.

Aspect 28 is the apparatus of any of aspects 21-27, further comprising a transceiver coupled to the at least one processor.

Aspect 29 is a method of wireless communication for implementing any of aspects 1 to 20.

Aspect 30 is an apparatus for wireless communication including means for implementing any of aspects 1 to 20.

Aspect 31 is a computer-readable medium storing computer executable code, where the code when executed by a processor causes the processor to implement any of aspects 1 to 20.

Aspect 32 is a method of wireless communication for implementing any of aspects 21 to 28.

Aspect 33 is an apparatus for wireless communication including means for implementing any of aspects 21 to 28.

Aspect 34 is a computer-readable medium storing computer executable code, where the code when executed by a processor causes the processor to implement any of aspects 21 to 28.

What is claimed is:

1. An apparatus for wireless communication of a user equipment (UE), comprising:
   memory; and
   at least one processor coupled to the memory and configured to:
      determine that a base station skips one or more semi-persistent scheduling (SPS) physical downlink shared channel (SPS PDSCH) occurrences; and
      skip transmission of a hybrid automatic repeat request (HARQ) feedback for the one or more SPS PDSCH occurrences; and at least one of:
      transmit a first HARQ feedback for a first SPS PDSCH based on blocked beam for an SPS occurrence of the one or more SPS PDSCH occurrences and perform beam sweeping based on the blocked beam for the SPS PDSCH; or
      transmit a second HARQ feedback for a downlink control information (DCI) and skip the HARQ feedback, wherein the DCI includes an indication that the base station will skip a second SPS PDSCH, and wherein a determination that the one or more SPS occurrences are skipped is based on reception of the indication in the DCI that the base station will skip the second SPS PDSCH.

2. The apparatus of claim 1, wherein the at least one processor coupled to the memory is further configured to:
   transmit the first HARQ feedback for the first SPS PDSCH based on the blocked beam for the SPS occurrence of the one or more SPS PDSCH occurrences; and
   perform the beam sweeping based on the blocked beam for the first SPS PDSCH.

3. The apparatus of claim 1, wherein the determination that the one or more SPS occurrences are skipped is based on an absence of a detected demodulation reference signal (DMRS) in a PDSCH after an attempted detection on one or more links.

4. The apparatus of claim 3, wherein the determination is further based on the absence of the detected DMRS in a physical downlink control channel (PDCCH) after the attempted detection on the one or more links.

5. The apparatus of claim 1, wherein the determination that the one or more SPS occurrences are skipped is based on the reception of the indication that the base station will skip the second SPS PDSCH in the DCI from the base station.

6. The apparatus of claim 5, wherein the DCI comprises the indication that the base station will skip the second SPS PDSCH is received in a multi-beam transmission.

7. The apparatus of claim 5, wherein the DCI comprises a DCI format 1_0 or a DCI format 1_1.

8. The apparatus of claim 5, wherein the DCI indicates a request for the HARQ feedback, wherein the at least one processor coupled to the memory is further configured to:
 transmit the HARQ feedback for the DCI and skip the HARQ feedback for the second SPS PDSCH.

9. The apparatus of claim 5, wherein the at least one processor coupled to the memory is further configured to:
 receive multiple SPS configurations for PDSCH having bundled HARQ feedback, wherein the DCI indicates that the base station will skip the second SPS PDSCH for one or more of the multiple SPS configurations.

10. The apparatus of claim 9, wherein the at least one processor coupled to the memory is further configured to: transmit the HARQ feedback if one of the multiple SPS configurations for the PDSCH is not skipped.

11. The apparatus of claim 1, wherein the at least one processor coupled to the memory is further configured to:
 transmit, to the base station, a communication during at least one of the one or more SPS PDSCH occurrences.

12. The apparatus of claim 11, wherein the communication transmitted to the base station at the one or more SPS PDSCH occurrences is a discontinuous transmission.

13. The apparatus of claim 11, wherein the one or more SPS PDSCH occurrences are associated with one or more component carriers.

14. The apparatus of claim 11, wherein the one or more SPS PDSCH occurrences are associated with one or more SPS configurations.

15. The apparatus of claim 11, wherein the one or more SPS PDSCH occurrences are associated with a primary cell or one or more secondary cells.

16. The apparatus of claim 11, wherein the one or more SPS PDSCH occurrences are associated with a single traffic flow with the base station.

17. The apparatus of claim 11, wherein the communication at the one or more SPS PDSCH occurrences does not correspond with an SPS PDSCH occurrence indicated in the DCI.

18. The apparatus of claim 11, wherein the communication at the one or more SPS PDSCH occurrences is associated with an SPS configuration from a plurality of active SPS configurations, the SPS configuration being indicated by the base station.

19. The apparatus of claim 11, wherein the communication at the one or more SPS PDSCH occurrences is associated with one or more remaining SPS configurations from a plurality of active SPS configurations that are different from an SPS configuration indicated by the base station.

20. The apparatus of claim 1, further comprising a transceiver coupled to the at least one processor.

21. An apparatus for wireless communication of a base station, comprising:
 memory; and
 at least one processor coupled to the memory and configured to:
  configure a UE for a semi-persistent scheduling (SPS) physical downlink shared channel (SPS PDSCH);

transmit, in downlink control information (DCI), an indication to the UE that the base station will skip a transmission of one or more SPS PDSCH occurrences;
  skip the transmission of the one or more SPS PDSCH occurrences; and
  transmit multiple SPS configurations for PDSCH having bundled HARQ feedback, wherein the DCI indicates that the base station will skip the one or more SPS PDSCH occurrences for one or more of the multiple SPS configurations.

22. The apparatus of claim 21, wherein the DCI comprises the indication that the base station will skip the one or more SPS PDSCH occurrences is transmitted in a multi-beam transmission.

23. The apparatus of claim 21, wherein the DCI comprises a DCI format 1_0 or a DCI format 1_1.

24. The apparatus of claim 21, wherein the at least one processor coupled to the memory is further configured to:
 receive, from the UE, a communication during at least one of the one or more SPS PDSCH occurrences.

25. The apparatus of claim 21, further comprising a transceiver coupled to the at least one processor.

26. A method of wireless communication at a user equipment (UE), comprising:
 determining that a base station skips one or more semi-persistent scheduling (SPS) physical downlink shared channel (SPS PDSCH) occurrences; and
 skipping transmission of a hybrid automatic repeat request (HARQ) feedback for the one or more SPS PDSCH occurrences; and at least one of:
  transmitting a first HARQ feedback for a first SPS PDSCH based on blocked beam for an SPS occurrence of the one or more SPS PDSCH occurrences and perform beam sweeping based on the blocked beam for the SPS PDSCH; or
  transmitting a second HARQ feedback for a downlink control information (DCI) and skip the HARQ feedback, wherein the DCI includes an indication that the base station will skip a second SPS PDSCH and skip the HARQ feedback, and wherein a determination that the one or more SPS occurrences are skipped is based on reception of the indication in the DCI that the base station will skip the second SPS PDSCH.

27. A method of wireless communication at a base station, comprising:
 configuring a UE for a semi-persistent scheduling (SPS) physical downlink shared channel (SPS PDSCH);
 transmitting, in downlink control information (DCI), an indication to the UE that the base station will skip a transmission of one or more SPS PDSCH occurrences;
 skipping the transmission of the one or more SPS PDSCH occurrences; and
 transmitting multiple SPS configurations for PDSCH having bundled HARQ feedback, wherein the DCI indicates that the base station will skip the one or more SPS PDSCH occurrences for one or more of the multiple SPS configurations.

* * * * *